(12) United States Patent
Flynn et al.

(10) Patent No.: US 9,075,557 B2
(45) Date of Patent: Jul. 7, 2015

(54) VIRTUAL CHANNEL FOR DATA TRANSFERS BETWEEN DEVICES

(71) Applicant: Fusion-io, Inc., Salt Lake City, UT (US)

(72) Inventors: David Flynn, Sandy, UT (US); Robert Wipfel, Draper, UT (US)

(73) Assignee: SanDisk Technologies, Inc., Plano, TX (US)

( * ) Notice: Subject to any disclaimer, the term of this patent is extended or adjusted under 35 U.S.C. 154(b) by 0 days.

(21) Appl. No.: 14/018,172

(22) Filed: Sep. 4, 2013

(65) Prior Publication Data

US 2014/0344488 A1 Nov. 20, 2014

Related U.S. Application Data

(60) Provisional application No. 61/823,809, filed on May 15, 2013.

(51) Int. Cl.
  *G06F 3/00* (2006.01)
  *G06F 5/14* (2006.01)
  *G06F 13/00* (2006.01)

(52) U.S. Cl.
  CPC . *G06F 5/14* (2013.01); *G06F 13/00* (2013.01)

(58) Field of Classification Search
  CPC .......... G06F 8/61; H04L 41/069; H04L 67/34
  See application file for complete search history.

(56) References Cited

U.S. PATENT DOCUMENTS

| 5,301,351 | A | * | 4/1994 | Jippo | 709/233 |
| 5,944,797 | A | | 8/1999 | Gregg et al. | |
| 5,978,866 | A | * | 11/1999 | Nain | 710/22 |
| 6,874,040 | B2 | | 3/2005 | Gregg | |
| 7,356,628 | B2 | * | 4/2008 | Swartzentruber | 710/104 |
| 7,586,516 | B2 | * | 9/2009 | Koide | 348/207.1 |
| 7,814,262 | B2 | * | 10/2010 | Sinclair | 711/103 |
| 8,069,279 | B2 | | 11/2011 | Go et al. | |
| 8,266,338 | B2 | | 9/2012 | Go et al. | |
| 2011/0211431 | A1 | * | 9/2011 | Nakano et al. | 369/44.34 |
| 2012/0159103 | A1 | * | 6/2012 | Peinado et al. | 711/163 |
| 2012/0239833 | A1 | * | 9/2012 | Yoshimura | 710/52 |

OTHER PUBLICATIONS

Recto, Renato, "A Tutorial of the RDMA Model", HPCWire, Sep. 15, 2006, pp. 6, http://archive.hpcwire.com/hpc/885757.html.
"Remote Direct Memory Access (RDMA)", SearchStorage, Sep. 2005, pp. 2, http://searchstorage.techtarget.com/definition/Remote-Direct-Memory-Access.
"Fastbus Data-Mover: FRITZ", Cleo Group, Apr. 25, 1996, pp. 3, http://www.hep.caltech.edu/cleo/daq_tdr/node31.html.

* cited by examiner

*Primary Examiner* — Jing-Yih Shyu
(74) *Attorney, Agent, or Firm* — Kunzler Law Group, PC

(57) ABSTRACT

Apparatuses, systems, and methods are disclosed for a virtual channel for data transfers between devices. A method includes presenting an address space for a memory buffer. The address space may be larger than a physical capacity of the memory buffer. A method includes controlling, from a peripheral device, a rate at which a data source transfers data to a memory buffer using a presented address space based on a rate at which a data target transfers data from the memory buffer using the presented address space so that an amount of data stored in the memory buffer remains at or below a physical capacity of the memory buffer.

19 Claims, 13 Drawing Sheets

VIRTUAL CHANNEL FOR DATA TRANSFERS BETWEEN DEVICES

CROSS-REFERENCES TO RELATED APPLICATIONS

This application claims the benefit of U.S. Provisional Patent Application No. 61/823,809 entitled "VIRTUAL CHANNEL FOR DATA TRANSFERS BETWEEN DEVICES" and filed on May 15, 2013, for David Flynn, which is incorporated herein by reference.

TECHNICAL FIELD

The present disclosure, in various embodiments, relates to data transfers and more particularly relates to data transfers between peripheral devices.

BACKGROUND

Peripheral devices often use host memory for data transfers. Software on a host may request that a supplying peripheral write data into host memory, and wait for acknowledgement of completion before requesting that a consuming peripheral read the data from host memory to complete the data transfer.

However, data transfers to and from host memory consume two units of host memory bandwidth for each unit of data transferred. Further, a host processer may issue each transfer request to the peripherals and receive each completion notification from the peripherals, introducing processer response time latency into the data transfer as well as increasing overhead for the processor, taxing both host memory resources and host processor resources.

If the portion of host memory for a data transfer is increased to reduce the effect of processor latency and to avoid excessive processor usage, additional latency may be introduced to the data transfer while waiting for the larger memory reads and writes. Alternatively, if the portion of host memory for a data transfer is minimized, the processor may issue transfer requests to the peripherals and receive completions at an excessive rate, increasing the burden on the processor and the introduced processor latency. In other words, there are often conflicting demands to use a small portion of host memory to minimize latency and memory usage on the one hand, or to use a large portion of host memory to allow for longer processor response times and minimize processor usage on the other hand.

SUMMARY

Methods are presented. In one embodiment, a method includes presenting an address space for a memory buffer. A presented address space for a memory buffer, in certain embodiments, is larger than a physical capacity of the memory buffer. A method, in one embodiment, includes controlling, from a peripheral device, a rate at which a data source transfers data to a memory buffer based on a rate at which a data target receives data from the memory buffer, so that an amount of data stored in the memory buffer remains at or below the physical capacity of the memory buffer.

Apparatuses are presented. In one embodiment, a data recording media is configured to store data received by way of a data transfer from a source peripheral to a target peripheral. A transfer control module, in certain embodiments, is configured to manage throughput of a data transfer so that a source peripheral and a target peripheral transfer data without acknowledgments between the source peripheral and the target peripheral. A first data interconnect, in one embodiment, is between a transfer control module and a peripheral bus. A second data interconnect, in a further embodiment, is between a transfer control module and a data recording media.

An apparatus, in one embodiment, includes means for presenting a larger address space for a transfer buffer than a physical capacity of the transfer buffer. In a further embodiment, an apparatus includes means for managing a sliding window between a position in a presented address space to which a data source writes data and a position in the presented address space from which a data target reads data so that a size of the sliding window fits within a physical capacity of a transfer buffer.

Systems are presented. In one embodiment, a peripheral device is in communication with a peripheral bus. A virtual channel for a peripheral device, in certain embodiments, includes a memory buffer accessible on a peripheral bus. In a further embodiment, a transfer controller for a virtual channel is configured to present a logical address space for a memory buffer over a peripheral bus. A logical address space for a memory buffer, in one embodiment, is larger than a physical capacity of the memory buffer. In certain embodiments, a transfer controller is configured to manage transfers of data for a virtual channel so that data does not overrun a memory buffer of the virtual channel.

Computer program products are presented. A computer program product, in one embodiment, comprises a computer readable storage medium storing computer usable program code executable to perform operations. In certain embodiments, an operation includes providing a write credit to a source client to write data of a data transfer to a memory buffer. An operation, in a further embodiment, includes providing a read credit to a target client to read data of a data transfer from a memory buffer. In one embodiment, an operation includes managing allocation of write credits and read credits so that a size of a memory buffer is smaller than a presented address space for the memory buffer.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
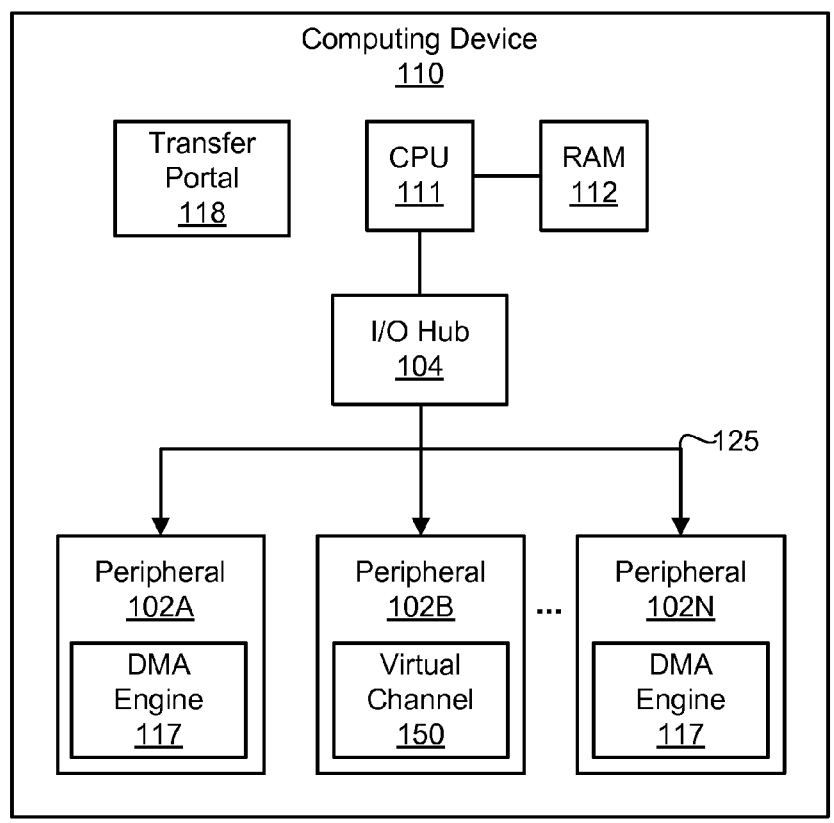
FIG. 1A is a schematic block diagram illustrating one embodiment of system for a virtual channel.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), phase change RAM (PRAM or PCM), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

FIG. 1A depicts one embodiment of system 100 for a virtual channel 150 to facilitate data transfers between peripheral devices 102. The system 100, in the depicted embodiment, includes a host computing device 110. The host computing device 110 may include a processor 111 such as a central processing unit (CPU), host memory 112, an input/output (I/O) hub 104, and a plurality of peripheral devices 102A-N in communication with a peripheral bus 125.

The host computing device 110 may comprise an electronic device capable of providing electric power and/or a communication interface for one or more peripheral devices 102. For example, the host computing device 110 may comprise a server computer, a personal computer, a desktop computer, a laptop computer, a workstation, a handheld or mobile device, a storage controller of a storage area network (SAN), a computer cluster, a network switch, a network router, an appliance such as a database or storage appliance, or another computing device 110 comprising one or more processors 111 and/or volatile memory 112.

The one or more processors 111 (and/or processor cores) may be in communication with the volatile memory 112 directly, through a root complex, or the like. The host volatile memory 112 may comprise random access memory (RAM), such as dynamic RAM (DRAM) (e.g., synchronous DRAM (SDRAM)), static RAM (SRAM), or the like. The host computing device 110 and/or the processor 111 may store data for executing applications in the volatile memory 112, for the one or more peripherals 102, or the like, so that the data is accessible to the one or more processors 111. The processor 111, in one embodiment, executes one or more device drivers for the peripheral devices 102 to coordinate functioning of the peripheral devices 102. In certain embodiments, a device driver for the virtual channel 150 may include or otherwise provide a transfer portal 118.

The processor 111, a root complex, the I/O hub 104, or the like may make the volatile memory 112 addressable and/or accessible to peripheral devices 102 over the peripheral bus 125. The processor 111 may communicate with the peripherals 102 directly, using a root complex (e.g., a northbridge), using the I/O hub 104 (e.g., a southbridge), or the like. The I/O hub 104 may comprise an I/O controller hub 104, a southbridge chip or chipset, or other module configured to manage communications between the processor 111 and peripherals 102 on the peripheral bus 125. In other embodiments, based on the type of peripheral bus 125 or the like, the processor 111 may manage communications with peripherals 102 on the peripheral bus 125, a root complex or northbridge may manage communications with peripherals 102 on the peripheral bus 125, or the like.

In one embodiment, the plurality of peripheral devices 102A-N comprise endpoint devices on the peripheral bus 125 capable of providing and/or receiving data over the peripheral bus 125. The peripheral devices 102A-N may include a storage device, a graphics processor unit (GPU), a network interface card (NIC), an input device, an output device, an I/O device, or the like, and may be internal to the computing device 110 or external to the computing device 110. A peripheral device 102, in one embodiment, may comprise a source or producer peripheral device 102 that provides data of a data transfer. In another embodiment, a peripheral device 102 may comprise a target or consumer peripheral device 102 that receives data of a data transfer. For example, a storage peripheral device 102 may provide data to another peripheral device 102 as a source peripheral device 102 and may receive data from another peripheral device 102 as a target peripheral device 102.

The peripheral bus 125 comprises a serial or parallel interconnect for data communications between peripheral devices 102, between a peripheral device 102 and the processor 111 and/or volatile memory 112, or the like. In one embodiment, the peripheral bus 125 may include a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network, Infiniband, SCSI remote direct memory access (RDMA), or the like. The peripheral bus 125, in certain embodiments, may also include one or more switches, hubs, routers, or other interconnect devices. The peripheral bus 125 may provide direct memory access to host volatile memory 112, to memory found on peripheral devices 102A-N, provide for asynchronous notifications in the form of interrupts, or the like.

In certain embodiments, one or more of the peripheral devices 102 may be configured to transfer data using a direct memory access (DMA) transfer to or from host volatile memory 112. For a DMA transfer using host volatile memory 112, a device driver on the host computing device 110 may request that a source peripheral 102 write data into the host volatile memory 112 and wait for an acknowledgement before requesting that a target peripheral device 102 read the data from host volatile memory 112 to complete the data transfer.

Further, a DMA transfer using host volatile memory 112 may use two units of host memory bandwidth for each unit of data transferred, as the source peripheral device 102 transfers data to the host volatile memory 112 and the target peripheral device 102 transfers the data from the host volatile memory 112. Additionally, a host processor 111 may issue each transfer request to the peripherals 102 and receive each completion notification from the peripherals 102, introducing processer 111 response time latency into the data transfer as well as increasing overhead for the processor 111, taxing both host memory 112 resources and host processor 111 resources.

If a portion of host memory 112 for a data transfer is increased to reduce the effect of processor 111 latency and to avoid excessive processor 111 usage, additional latency may be introduced to the data transfer while waiting for the larger memory 112 reads and writes. Alternatively, if the portion of host memory 112 used for a data transfer is minimized, the processor 111 may issue transfer requests to the peripherals 102 and receive completions at an excessive rate, increasing the burden on the processor 111 and the introduced processor 111 latency.

In one embodiment, to facilitate data transfers while minimizing or removing the impact on the processor 111 and/or the volatile memory 112 of the host computing device 110, one or more of the peripheral devices 102A-N may include a virtual channel 150. The virtual channel 150 may manage a data transfer on the peripheral bus 125, so that data of the transfer is not stored in the volatile memory 112 of the host computing device 110 during the data transfer. In other embodiments, the virtual channel 150 may manage a data transfer to or from the volatile memory 112 of the host computing device 110 (e.g., between a peripheral device 102 and the volatile memory 112), but may manage the data transfer substantially independently from the host processor 111, with little or no involvement by the processor 111. In certain embodiments, the virtual channel 150 may facilitate data transfers between two DMA engines 117 of the peripheral devices 102A-N, so that the data transfers may be masterless. In a masterless data transfer between DMA engines 117, in one embodiment, the DMA engines 117 of both peripheral devices 102 of the data transfer may act as DMA masters, with the virtual channel 150 transparently providing flow control between the DMA engines 117 or the like.

The virtual channel 150, in one embodiment, may be located on or otherwise integrated with a peripheral device 102 such as a storage device, a GPU, a NIC, or the like, that comprises a source peripheral device 102 or a target peripheral device 102 of a data transfer. In another embodiment, the virtual channel 150 may comprise a dedicated transfer peripheral device 102 that facilitates data transfers between or among other peripheral devices 102 (e.g., the virtual channel 150 on a peripheral device 102B may facilitate a data transfer between a separate source peripheral device 102A and target peripheral device 102N). In other embodiments, the virtual channel 150 may be co-located or integrated with the I/O hub 104, a PCIe switch, a northbridge, a southbridge, the processor 111, or the like.

In certain embodiments, the virtual channel 150 may comprise a memory buffer to which a source peripheral 102 writes data of a data transfer and from which a target peripheral 102 reads the data to complete the data transfer. The virtual channel 150, in one embodiment, may present a larger logical address space to the peripheral devices 102 to use for data transfers than an actual physical storage capacity of the memory buffer. For example, the virtual channel 150 may manage or control a rate of a data transfer so that the data does not overrun or exceed the smaller storage capacity of the memory buffer, and it appears to the peripheral devices 102 that the entire logical address space is available for data transfers. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address (LBA), a memory address, a cylinder/head/sector (CHS) address, a file name, an object identifier, an inode, a Universally Unique Identifier (UUID), a Globally Unique Identifier (GUID), a hash code, a signature, an index entry, a range, an extent, or the like.

In one embodiment, the virtual channel 150 may comprise a data exchange, a transfer circuit, a semaphore memory, a transfer buffer, a transfer memory, a transfer pipe, a transfer socket, a flow control buffer, a hardware transfer buffer, an accelerated transfer channel, or the like to facilitate data transfers between peripheral devices 102 with little or no overhead of the processor 111 and the volatile memory 112 of the host computing device 110. The virtual channel 150 may be accessible over the peripheral bus 125, with a logical address space of the virtual channel 150 addressable and/or accessible over the peripheral bus 125. The virtual channel 150, in certain embodiments, provides hardware-based flow control for data transfers directly on the peripheral bus 125, so that the processor 111 may not be required to provide flow control, so that peripheral devices 102 may transfer data to and from the virtual channel 150 without acknowledging each read and write operation to the other peripheral device 102, or the like. As used herein, flow control comprises controlling or managing a throughput or other rate of data transmission between a data source and a data target. The virtual channel 150 may use flow control to prevent a data source from overrunning a memory buffer of the virtual channel 150, overrunning a data target, or the like. The virtual channel 150 may use stop-and-wait flow control, sliding window flow control, open-loop flow control, closed-loop flow control, or the like to manage data transfers among peripheral devices 102.

In certain embodiments, the virtual channel 150 may be configured as an endpoint for DMA engines 117, so that a DMA engine 117 of a source peripheral device 102 may DMA write data of a data transfer to the virtual channel 150, a DMA engine 117 of a target peripheral device 102 may DMA read data of a data transfer from the virtual channel 150, or the like. A DMA transfer, in one embodiment, comprises reading/and or writing data to a memory address over a bus 125. A DMA engine 117, as used herein, may comprise an agent of a peripheral device 102 or the like that moves data on a bus 125 based on one or more DMA descriptors, such as an address, an address and length tuple, or the like describing a range of memory to be transferred on the bus 125. A DMA master may comprise a DMA engine 117 performing, managing, and/or initiating a DMA transfer.

In certain embodiments, it may be beneficial for both a source peripheral device 102 and a target peripheral device 102 to master a DMA data transfer. A peripheral device 102 may have knowledge of when it is ready to transfer or receive data, while other peripheral devices 102 may not have such knowledge. For example, a NIC peripheral device 102 may be configured to determine when a data network is ready to transfer data. Similarly, a storage controller for a storage peripheral device 102 may be configured to determine when storage media is ready to transfer data. Flow control information for a data transfer may be known to the peripheral device 102 itself, and may be at least partially managed by the peripheral device 102 mastering the data transfer. By using the virtual channel 150 instead of a DMA transfer using host volatile memory 112, a source peripheral device 102 may master a transfer, such as a DMA transfer, to the virtual channel 150 and a target peripheral device 102 may master a transfer, such as a DMA transfer, from the virtual channel 150, allowing both the source peripheral device 102 and the target peripheral device 102 to master the same data transfer.

In one embodiment, the virtual channel 150, by being located on the peripheral bus 125 with a logical address space addressable on the peripheral bus 125, allows device drivers for the peripheral devices 102, executing on the processor 111, to target the virtual channel 150 for data transfers, in cooperation with a transfer portal 118 or the like. In certain embodiments, a logical address space of the virtual channel 150 may be mapped into virtual memory of a device driver or other application, so that data transfers between peripheral devices 102 using the virtual channel 150 may be completed using virtual memory addresses. The processor 111, a root complex, the I/O hub 104, an operating system, or the like may be configured to allow applications to access virtual memory mapped to physical memory of the virtual channel 150 disposed on a peripheral device 102 on the peripheral bus 125.

For example, in one embodiment, the virtual channel 150, a device driver for the virtual channel 150 such as a transfer portal 118, an operating system, or the like maintains a virtual to physical page table translation or the like, allowing an application or other client to transfer data to or from the virtual channel 150 in virtual memory of the client. In certain embodiments, the virtual channel 150, a device driver for the virtual channel 150 such as a transfer portal 118, or the like may provide a port or other interface to hide or mask a peripheral device 102 of the virtual channel 150, providing a wrapper around a device driver for the virtual channel 150 (e.g., a transfer portal 118, an initiation/completion engine, a source module 402 and/or target module 404, a bridge module 406, or the like as described below). In this manner, the virtual channel 150 may act as a cross-application, flow-controlled tunnel, allowing applications or other clients to transfer data from application to application, from peripheral device 102 to peripheral device 102, or the like, with reduced overhead for the processor 111 and/or the host memory 112.

In one embodiment, the virtual channel 150, a device driver for the virtual channel 150, or the like provides a transfer portal 118 executing on the host computing device 110 to manage or coordinate data transfers for one or more virtual channels 150. A transfer portal 118 may support transfer requests, abort requests, or the like from clients, may provide completion notifications, error notifications, or the like to clients, or the like. A transfer portal 118 may include a command queue and/or a completion queue for data transfers. A command queue and/or a completion queue may be DMA capable, registered and accessible by a base address and a length or the like. The virtual channel 150, a device driver for the virtual channel 150, and/or a transfer portal 118 may manage a command queue and/or a completion queue as a ring buffer, reusing host memory 112, memory of the virtual channel 150, or the like in a logically circular manner to store transfer commands or requests, completion notifications, or the like. A transfer portal 118 may maintain counts of how many data transfers are pending in a command queue, how many data transfers are completed and have passed to a completion queue, or the like. The virtual channel 150, a device driver for the virtual channel 150, a transfer portal 118, or the like may use a counter value as an identifier or handle for a data transfer.

While the virtual channel 150 may provide data transfers between peripheral devices 102 over a peripheral bus 125 with little or no direct use of host memory 112 or CPU 111, in certain embodiments, a device driver for the virtual channel 150 may coordinate the data transfers on the host computing device 110 using a transfer portal 118 or the like. For example, a device driver, a transfer portal 118, or the like may receive transfer commands or requests from clients, including information of a data transfer, such as a source address and length or other source data identifier, a target address and length or other target data identifier, device specific transfer data for a peripheral device 102, completion notification information, or the like, without transferring the actual data into host memory 112. The device driver and/or transfer portal 118 may use the information from a transfer command or request to initiate a data transfer from a data source peripheral 102 to the virtual channel 150 from the virtual channel 150 to a data target peripheral 102 over the peripheral bus 125.

A device driver for the virtual channel 150, a transfer portal 118, or the like, in one embodiment, may manage data transfers at a larger granularity than the virtual channel 150, breaking up data transfers into smaller segments or chunks based on an architecture, size, and/or geometry of the virtual channel 150. The virtual channel 150, a device driver for the virtual channel 150, a transfer portal 118, or the like may use a credit based system for data transfers, allocating credits to applications or other clients and performing data transfers in exchange for the credits.

In one embodiment, the virtual channel 150, a device driver for the virtual channel 150, a transfer portal 118, or the like makes the virtual channel 150 available in user-space, by mapping a memory buffer of the virtual channel 150 into virtual memory of a user-space process, using a user-space library or other interface, or the like. The virtual channel 150, a device driver for the virtual channel 150, a transfer portal 118, or the like may provide user-space access to the virtual channel 150 using security checked references to an interface for the virtual channel 150, such as a transfer engine, an initiation/completion engine, a transfer portal 118, or the like for the virtual channel 150.

As used herein, kernel-space may comprise an area of memory (e.g., volatile memory, virtual memory, main memory) of the host computing device 110; a set of privileges, libraries, or functions; a level of execution; or the like reserved for a kernel, operating system, or other privileged or trusted processes or applications. User-space, as used herein, may comprise an area of memory (e.g., volatile memory, virtual memory, main memory) of the host computing device 110; a set of privileges, libraries, or functions; a level of execution; or the like available to untrusted, unprivileged processes or applications. Due to differences in privileges, access control restrictions, and the like, transferring data between kernel-space and user-space may cause unnecessary context switches, memory transfers, or the like. For this reason, in certain embodiments, the virtual channel 150 is available to applications or other clients in user-space, bypassing certain overhead and restrictions associated with kernel-space.

While data transfers using the virtual channel 150 may include a transfer from a source peripheral device 102 to the virtual channel 150 and from the virtual channel 150 to a target peripheral device 102, in certain embodiments, the data of the data transfer is kept local to a common root of the peripherals 102, such as a common switch, I/O hub 104, root complex, or the like. In a further embodiment, the virtual channel 150 may be co-located on a source peripheral device 102 and/or a target peripheral device 102, so that at least one of the data transfers for the virtual channel 150 is local within a peripheral device 102, and does not enter or otherwise use the peripheral bus 125. In this manner, in certain embodiments, the virtual channel 150 completes data transfers with little or no use of host volatile memory 112 and without taxing the host processor 111, while providing a larger logical address space for data transfers than is actually physically available in a memory buffer for the data transfers.

Figure 1B:
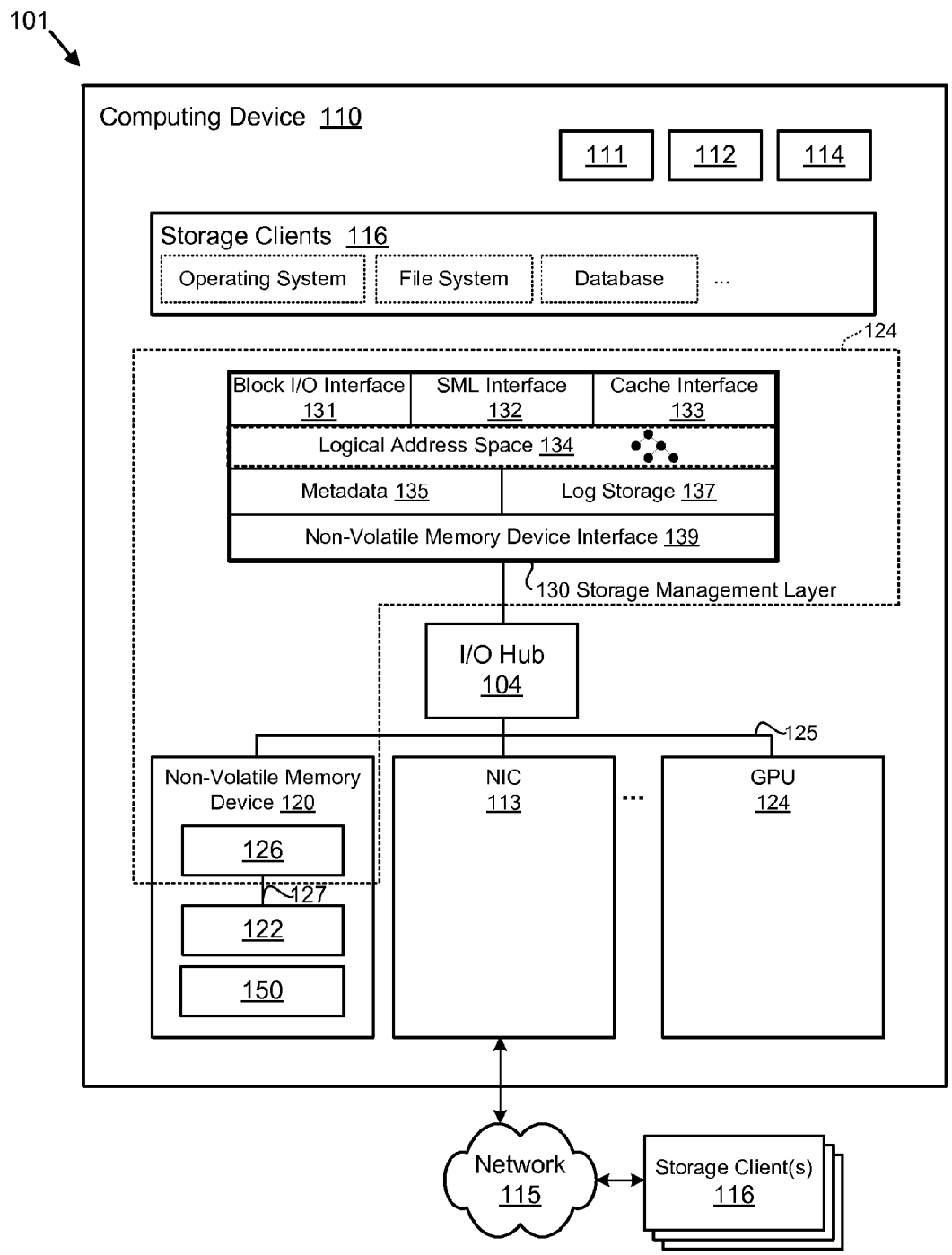
FIG. 1B is a schematic block diagram illustrating another embodiment of a system for a virtual channel.

FIG. 1B depicts another embodiment of a system 101 for a virtual channel 150. The system 101, in certain embodiments, may be substantially similar to the system 100 described above with regard to FIG. 1A. In the depicted embodiment, the virtual channel 150 is located on or otherwise integrated with a peripheral device comprising a non-volatile memory device 120 or other storage device 120. The virtual channel 150, in certain embodiments, is configured to facilitate data transfers between the non-volatile memory device 120 and a second peripheral, such as a NIC 113, a GPU 124, or the like without using host memory 112 of the computing device 110, using little or no overhead of the host processor 111. In other embodiments, the virtual channel 150 may be located on or otherwise integrated with another peripheral device, such as the NIC 113, the GPU 124, a dedicated transfer peripheral device, or the like.

According to various embodiments, a non-volatile memory controller 124 manages one or more non-volatile memory devices 120. The non-volatile memory device(s) 120 may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller 124 may comprise a storage management layer (SML) 130, which may present a logical address space to one or more storage clients 116. One example of an SML 130 is the Virtual Storage Layer® of Fusion-io, Inc. of Salt Lake City, Utah. Alternatively, each non-volatile memory device 120 may comprise a non-volatile memory media controller 126, which may present a logical address space to the storage clients 116. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address (LBA), a memory address, a cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index, to map logical addresses of the logical address space to media storage locations on the non-volatile memory device(s) 120. The SML 130 may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address may include, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML 130 may map logical addresses to physical data resources of any size and/or granularity, which may or may not correspond to the underlying data partitioning scheme of the non-volatile memory device(s) 120. For example, in some embodiments, the non-volatile memory controller 124 is configured to store data within logical memory units that are formed by logically combining a plurality of physical memory units, which may allow the non-volatile memory controller 124 to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer 130 may have a logical capacity, which may correspond to the number of available logical addresses in the logical address space and the size (or granularity) of the data referenced by the logical addresses. For example, the logical capacity of a logical address space comprising $2^{32}$ unique logical addresses, each referencing 2048 bytes (2 KiB) of data may be $2^{43}$ bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s) 120. For example, the storage management layer 130 may present a 64-bit logical address space to the storage clients 116 (e.g., a logical address space referenced by 64-bit logical addresses), which exceeds the physical capacity of the underlying non-volatile memory devices 120. The large logical address space may allow storage clients 116 to allocate and/or reference contiguous ranges of logical addresses, while reducing the chance of naming conflicts. The storage management layer 130 may leverage the any-to-any mappings between logical addresses and physical storage resources to manage the logical address space independently of the underlying physical storage devices 120. For example, the storage management layer 130 may add and/or remove physical storage resources seamlessly, as needed, and without changing the logical addresses used by the storage clients 116.

The non-volatile memory controller 124 may be configured to store data in a contextual format. As used herein, a contextual format refers to a self-describing data format in which persistent contextual metadata is stored with the data on the physical storage media 122. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client 116 from other sectors of data owned by the storage client 116. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media 122, a memory division index, or the like).

In some embodiments, the contextual data format may allow data context to be determined (and/or reconstructed) based upon the contents of the non-volatile memory media 122, and independently of other metadata 135, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media 122 may allow data context to be determined without reference to other metadata 135. For example, the contextual data format may allow the metadata 135 to be reconstructed based only upon the contents of the non-volatile memory media 122 (e.g., reconstruct the any-to-any mappings between logical addresses and media locations).

In some embodiments, the non-volatile memory controller 124 may be configured to store data on one or more asymmetric, write-once media 122, such as solid-state storage media 122. As used herein, a "write once" storage medium 122 refers to a storage medium 122 that is reinitialized (e.g., erased) each time new data is written or programmed thereon. As used herein, an "asymmetric" storage medium 122 refers to a storage medium 122 having different latencies for different storage operations. Many types of solid-state storage media 122 are asymmetric; for example, a read operation may be much faster than a write/program operation, and a write/program operation may be much faster than an erase operation (e.g., reading the media 122 may be hundreds of times faster than erasing, and tens of times faster than programming the media). In other embodiments, the storage media 122 may be symmetric or substantially symmetric.

The memory media 122 may be partitioned into memory divisions that can be erased as a group (e.g., erase blocks) in order to, inter alia, account for the asymmetric properties of the media 122. As such, modifying a single data segment in-place may require erasing the entire erase block comprising the data, and rewriting the modified data to the erase block, along with the original, unchanged data. This may result in inefficient "write amplification," which may excessively wear the media 122. Therefore, in some embodiments, the non-volatile memory controller 124 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller 124 may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client 116, identifying the logical addresses of the request, performing one or more storage operations on non-volatile memory media 122, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller 124 comprises a groomer, which is configured to reclaim memory divisions (e.g., erase blocks) for reuse. The write out-of-place paradigm implemented by the non-volatile memory controller 124 may result in obsolete or invalid data remaining on the non-volatile memory media 122. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media 122 may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller 124 may be further configured to store data in a log format. As described above, a log format refers to a data format that defines an ordered sequence of storage operations performed on a non-volatile memory media 122. In some embodiments, the log format comprises storing data in a pre-determined sequence of media addresses of the non-volatile memory media 122 (e.g., within sequential pages and/or erase blocks of the media 122). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller 124 may maintain a current append point at a media address of the non-volatile memory device 120. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller 124 may identify the "next" available memory division (the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media 122, and independently of other metadata 135. As discussed above, invalid data may not be removed from the non-volatile memory media 122 until the memory division comprising the data is reclaimed. Therefore, multiple "versions" of data having the same context may exist on the non-volatile memory media 122 (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

The virtual channel 150 may be in communication with the SML 130, with a storage client 116, with a processor 111 of the computing device 110, or the like. The SML 130 may operate on the computing device 110, which may comprise a processor 111 and a volatile memory 112. The host computing device 110 may include one or more peripherals, such as the depicted non-volatile memory device 120, NIC 113, and GPU 124. The processor 111 may comprise one or more central processing units (CPUs), one or more general-purpose processors, one or more application-specific processors, one or more virtual processors (e.g., the computing device 110 may be a virtual machine operating within a host), one or more processor cores, or the like. The NIC 113 may comprise one or more network interfaces configured to communicatively couple the computing device 110 (and/or non-volatile memory controller 124) to a communication network 115, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120. The non-volatile memory devices 120 may include different types of non-volatile memory devices including, but not limited to: solid-state storage devices, hard drives, optical drives, SAN storage resources, or the like. The non-volatile memory devices 120 may comprise respective non-volatile memory media controllers 126 and non-volatile memory media 122. As illustrated in FIG. 1B, The SML 130 may provide access to the non-volatile memory devices 120 via a traditional block I/O interface 131. Additionally, the SML 130 may provide access to enhanced functionality (large, virtual address space) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120 and/or the non-volatile memory media controllers 126.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122, which define an ordered sequence of storage operations performed on the non-volatile memory devices 120, as described above.

The SML 130 may further comprise a non-volatile memory device interface 139 configured to transfer data, commands, and/or queries to the non-volatile memory devices 120 over a peripheral bus 125, which may include, but is not limited to: a PCI Express or PCIe bus, an SATA bus, a PATA bus, a SCSI bus, a FireWire bus, a Fibre Channel bus, a USB, a PCIe-AS bus, a data network, an Infiniband bus, a SCSI RDMA interface, or the like. The non-volatile memory device interface 139 may communicate with the non-volatile memory devices 120 using input-output control (IO-CTL) command(s), IO-CTL command extension(s), remote direct memory access, or the like.

The non-volatile memory system 101, in the depicted embodiment, includes a virtual channel 150. The virtual channel 150, in one embodiment, is configured to facilitate data transfers between the non-volatile memory device 120 and other peripheral devices 102 such as the NIC 113 and/or the GPU 124. For example, the NIC 113 may receive data from storage clients 116 over the data network 115 and write the data to the virtual channel 150, using a DMA write or the like, and the non-volatile memory media controller 126 may read the data from the virtual channel 150, using a DMA read or the like and may store the data in the non-volatile memory media 122. The virtual channel 150 may manage or control a rate that the NIC 113 writes data to the virtual channel 150 and/or a rate that the non-volatile memory media controller 126 receives data from the virtual channel 150 so that data of the transfer remains within a memory buffer of the virtual channel 150 without overrunning or exceeding the capacity of the memory buffer (e.g., provide flow control for data transfers). In another embodiment, the non-volatile memory media controller 126 may write data from the non-volatile memory media 122 to the virtual channel 150 and the GPU 124 may read the data from the virtual channel 150 to complete a data transfer between the non-volatile memory device 120 and the GPU 124.

In one embodiment, the virtual channel 150 may be in communication with executable software code, such as a device driver, a transfer portal 118, SML 130, or the like, executing on the processor 111. The virtual channel 150 may comprise logic hardware of one or more of the non-volatile memory devices 120, such as a non-volatile memory media controller 126, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the virtual channel 150 may include a combination of both executable software code and logic hardware.

In one embodiment, the virtual channel 150 is configured to receive transfer requests from the SML 130 via a bus 125 or the like. The virtual channel 150 may be further configured to transfer data to/from various peripheral devices 120, 113, 124 via the bus 125. Accordingly, the virtual channel 150, in some embodiments, may comprise and/or be in communication with one or more direct memory access (DMA) modules/agents, remote DMA modules/agents, bus controllers, bridges, buffers, and so on to facilitate the transfer of data. In another embodiment, the virtual channel module 150 may receive transfer requests as an API call from a storage client 116, as an IO-CTL command, or the like. The virtual channel 150 is described in greater detail below with regard to FIGS. 2, 3, and 4.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements. The bus 127 may further comprise a control bus for communicating addressing and other command and control information to the non-volatile memory elements. In some embodiments, the bus 127 may communicatively couple the non-volatile memory elements to the non-volatile memory media controller 126 in parallel. This parallel access may allow the non-volatile memory elements to be managed as a group, forming a logical memory element. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 101.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The system 101 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

In one embodiment, the virtual channel 150 may transfer data directly between peripheral devices, such as the non-volatile memory device 120 and the NIC 113 (e.g., to or from the data network 115), the GPU 124, or the like. In certain embodiments, the virtual channel 150 may transfer data between two non-volatile memory devices 120, being disposed on one of the non-volatile memory devices 120, on a separate transfer device between the non-volatile memory devices 120, or the like. As described above, the virtual channel 150 may be located on the non-volatile memory device 120, on the NIC 113, on the GPU 124, on the I/O hub 104, on or in communication with the host processor 111, or the like. In certain embodiments, the system 101 may include multiple virtual channels 150, and a device driver for one or more of the virtual channels 150, a transfer portal 118, or the like may select a virtual channel 150 for a data transfer based on a topology of the data network 115, a topology of the peripheral bus 125, a characteristic of the I/O hub 104, or the like dynamically on a per data transfer basis.

Figure 2:
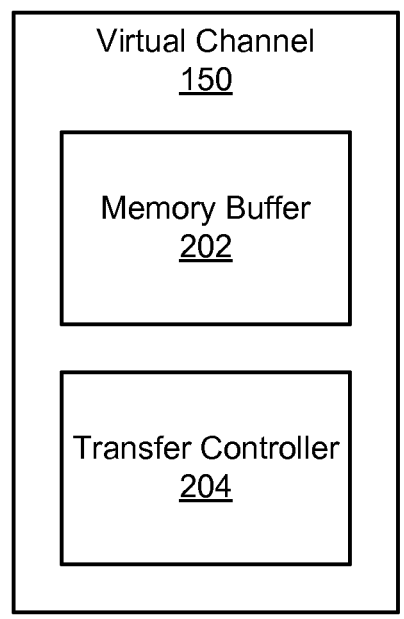
FIG. 2 is a schematic block diagram illustrating one embodiment of a virtual channel.

FIG. 2 depicts one embodiment of a virtual channel 150. The virtual channel 150 may be substantially similar to the virtual channel 150 described above with regard to FIGS. 1A and 1B. In the depicted embodiment, the virtual channel 150 includes a memory buffer 202 and a transfer controller 204. The memory buffer 202 and/or the transfer controller 204 for the memory buffer 202 may be co-located on a peripheral device 102, such as a data source peripheral device 102, a data target peripheral device 102, an intermediary transfer peripheral device 102, or the like. In general, the transfer controller 204 may be configured to present a logical address space for the memory buffer 202, to control a rate at which a data source peripheral device 102 transfers data to the memory buffer 202, to control a rate at which a data target peripheral device 102 receives data from the memory buffer 202, or the like. The transfer controller 204 may provide hardware-based flow control for data transfers over a peripheral bus 125, reducing overhead and latency that may otherwise be introduced into the data transfer by a host processor 111.

In one embodiment, the memory buffer 202 comprises volatile or non-volatile data storage or memory of the virtual channel 150. The memory buffer 202, in one embodiment, may comprise volatile memory or RAM such as DRAM, SDRAM, SRAM, or the like. In another embodiment, the memory buffer 202 may comprise non-volatile memory such as NAND flash memory, NOR flash memory, nano RAM or NRAM, nanocrystal wire-based memory, silicon-oxide based sub-10 nanometer process memory, graphene memory, SONOS memory, RRAM, PMC memory, CBRAM, MRAM, phase change RAM (PRAM or PCM), or the like. In certain embodiments, the memory buffer 202 comprises a data register or other an array of memory cells such as bi-stable flip-flops (e.g., D flip-flops, T flip-flops, JK flip-flops, or the like) or latches (e.g., SR NOR latches, SR NAND latches, JK latches, D latches, Earle latches, or the like), or other volatile or non-volatile memory cells.

In certain embodiments, the memory buffer 202 may not be exclusively used by the virtual channel 150, but may comprise existing, general purpose data storage media of a peripheral device 102, such as the non-volatile memory media 122 of the non-volatile memory device 120, volatile memory of a NIC 113 or GPU 124, or the like. In a further embodiment, instead of buffering data between a source and a target, the memory buffer 202 may comprise the final target of the data transfer, and the transfer controller 204 may manage a rate at which a data source peripheral device 102 transfers or writes data to the target memory buffer 202. In one embodiment, the virtual channel 150 may include multiple memory buffers 202, allowing the virtual channel 150 to perform multiple data transfers simultaneously in parallel. In a further embodiment, the transfer controller 204 manages the memory buffer 202 to perform multiple data transfers simultaneously in parallel using a single memory buffer 202.

In one embodiment, the memory buffer 202 may be configured so that a data source peripheral device 102 may transfer data to the memory buffer 202 at a different data transfer size than a data target peripheral device transfers data from the memory buffer 202. A data transfer size, as used herein, may comprise a size or amount of data that a data source peripheral device 102 and/or a data target peripheral device 102 transfers to the memory buffer 202 in a single transaction or series of transactions. For example, the memory buffer 202 may be byte addressable and a data source peripheral device 102 and a data target peripheral device 102 may transfer different numbers of bytes at a time, such as one or more bytes, blocks or sectors, words, pages, error correction code (ECC) blocks, or the like at a time. In this manner, in certain embodiments, the virtual channel 150 may transfer data between peripheral devices 102 with different data transfer sizes or units.

In one embodiment, the transfer controller 204 comprises control logic configured to manage the memory buffer 202 for the virtual channel 150. The transfer controller 204, in various embodiments, may include one or more logic circuits, an FPGA or other programmable logic, firmware for an FPGA or other programmable logic, microcode for execution on a microcontroller, an ASIC or other dedicated integrated circuit device, or the like. The transfer controller 204, in one embodiment, may be integrated with the memory buffer 202 within a single integrated circuit device or chip. In another embodiment, the transfer controller 204 and the memory buffer 202 may comprise separate integrated circuit devices or chips in communication over a single printed circuit board or group of interconnected circuit boards (e.g., mother and daughter card or the like). The transfer controller 204, in certain embodiments, may include one or more modules for managing the memory buffer 202 of the virtual channel 150, such as one or more of the modules described below with regard to FIGS. 3 and 4.

The transfer controller 204 and/or the transfer control module 304 described below, may comprise one or more data interconnects, allowing the transfer controller 204 and/or the transfer control module 304 to communicate with peripheral devices 102, with the memory buffer 202, or the like. In one embodiment, the transfer controller 204 and/or the transfer control module 304 may comprise a data interconnect with a peripheral bus 125, facilitating communications with a data source peripheral device 102, a data target peripheral device 102, a host processor 111, host volatile memory 112, or the like. In a further embodiment, the transfer controller 204 and/or the transfer control module 304 may comprise a data interconnect with the memory buffer 202 or another recording medium such as the non-volatile memory media 122 described above. For example, a data interconnect between the transfer controller 204 and/or the transfer control module 304 and a peripheral bus 125, an internal bus within a peripheral device 102, or the like may place the transfer controller 204 and/or the transfer control module 304 in communication with the memory buffer 202, the non-volatile memory media 122, or another recording medium.

In one embodiment, the transfer controller 204 presents a logical address space for the memory buffer 202, over the peripheral bus 125 or the like, allowing peripheral devices 102, device drivers, a transfer portal 118 or other entities to transfer data using the memory buffer 202 of the virtual channel 150. The transfer controller 204 may make a logical address for the memory buffer 202 available using one or more of a variety of memory mapping technologies, such as memory mapped I/O (MMIO), port I/O, port-mapped IO (PMIO), memory mapped file I/O, or the like. For example, the transfer controller 204 may make the presented logical address space available to peripheral devices 102 and/or applications using a PCI-e Base Address Register (BAR), or other suitable mechanism. The transfer controller 204 may also make the presented logical address space directly accessible via a memory bus of a processor 111, using an interface such as a double data rate (DDR) memory interface, HyperTransport, QuickPath Interconnect (QPI), or the like. Accordingly, the transfer controller 204 may make the logical address space of the memory buffer 202 accessible using memory access semantics, such as CPU load/store, DMA, $3^{rd}$ party DMA, remote DMA (RDMA), atomic test and set, or the like.

The transfer controller 204 may support DMA operations for the memory buffer 202 using the presented logical address space, allowing DMA engines 117 of peripheral devices 102 to perform DMA writes and/or DMA reads to complete data transfers using the virtual channel 150. In certain embodiments, the transfer controller 204 may allow both a DMA engine 117 of the data source peripheral device 102 and a DMA engine 117 of the data target peripheral device 102 to transfer data of the same data transfer as DMA masters, without waiting for acknowledgments from the DMA engine 117 of the other peripheral device 102 or the like.

The transfer controller 204, in one embodiment, presents a logical address space for the memory buffer 202 that is larger than a physical capacity of the memory buffer 202. In this manner, the memory buffer 202, the virtual channel 150, or the like, may appear to the peripheral devices 102A-N as having the larger capacity of the presented logical address space. The transfer controller 204 may hide or mask the physical capacity of the memory buffer 202, such that the peripheral devices 102A-N access the memory buffer 202 exclusively using the presented logical address space. As described above, a logical address space may comprise a logical or virtual representation of the memory buffer 202, with a plurality (e.g., range) of logical addresses.

To transparently provide a larger logical address space for a smaller backing memory buffer 202, in certain embodiments, the transfer controller 204 may provide flow control to manage or control a rate at which a data source peripheral device 102 and/or a data target peripheral device 102 transfers data, as described in greater detail below with regard to the transfer control module 304 of FIGS. 3 and 4. In one embodiment, the transfer controller 204 may control a rate at which a data source peripheral device 102 transfers data to the memory buffer 202 using the presented logical address space, based on a rate at which a data target peripheral device 102 transfers or receives data from the memory buffer 202 or the like, so that an amount of data stored in the memory buffer 202 remains at or below the physical capacity of the memory buffer 202. In a further embodiment, the transfer controller 204 may control a rate at which a data target peripheral device 102 transfers or receives data from the memory buffer 202, both a rate at which a data source peripheral device 102 transfers data to the memory buffer 202 and a rate at which a data target peripheral device 102 transfers or receives data from the memory buffer 202, or the like.

To ensure that data written or transferred to the memory buffer 202 by a data source peripheral device 102 does not overrun or exceed the capacity of the memory buffer 202, the transfer controller 204 may throttle or otherwise provide flow control for a rate at which a data source peripheral device 102 writes data to the memory buffer 202 based on a rate at which a data target peripheral device 102 reads data from the memory buffer 202. For example, in response to a data source peripheral device 102 filling the memory buffer 202 with data of a data transfer, exceeding an allocated amount of the memory buffer 202, exceeding a transfer threshold, or the like, the transfer controller 204 may stop the data source peripheral device 102 from writing additional data to the memory buffer 202 until a data target peripheral device 102 reads data of the data transfer from the memory buffer 202, the data is deleted, removed, or overwritten from the memory buffer 202, or the like.

The transfer controller 204, in one embodiment, provides flow control for a data source peripheral device 102 and/or a data target peripheral device 102 using a sliding window within the presented logical address space. In certain embodiments, logical addresses within the sliding window store data (e.g., are mapped to physical addresses of the memory buffer 202 that store data) and the transfer controller 204 removes, deletes, clears, overwrites, or expires data that falls out of the sliding window (e.g., data that a data target peripheral device 102 has transferred out of the memory buffer 202). The transfer controller 204 may manage the sliding window and/or the transfer rates for the memory buffer 202 so that the sliding window fits within (e.g., is less than or equal to) a size of the memory buffer 202. The transfer controller 204 may manage the memory buffer 202 as a ring buffer, cycling or rolling through the memory buffer 202 in a logically circular manner, reusing physical storage locations of the memory buffer 202 as the sliding window moves through the presented logical address space.

In further embodiments, the transfer controller 204 and/or the transfer control module 304 described below may provide flow control for data transfers, substantially as described above with regard to the transfer controller 204, without a memory buffer 202. The transfer controller 204 and/or the transfer control module 304 may manage read and/or write credits, manage a sliding window, manage a ring buffer data structure, or the like directly for a target location of a data transfer, such as the non-volatile media 122 of a non-volatile memory device 120, volatile memory or data registers of a NIC 113 or GPU 124, or another target memory/storage location for a data transfer, without buffering the data temporarily in a dedicated memory buffer 202. For example, the transfer controller 204 and/or the transfer control module 304 may use a logical ring buffer or sliding window for purposes of flow control for a data transfer, to track read credits and/or write credits or the like, and the ring buffer or sliding window may not correspond to or be associated with a memory buffer 202. In other embodiments, the memory buffer 202 may be disposed on a data target peripheral device 102 or the like, and the memory buffer 202 may comprise the target, so that the data target peripheral device 102 does not transfer or read the data from the memory buffer 202 to complete the data transfer, but the data transfer may be completed as a data source peripheral device 102 writes or transfers the data to the memory buffer 202.

In one embodiment, the transfer controller 204 provides deadlock detection, prevention, avoidance, or the like by mediating data transfers between a data source peripheral device 102 and a data target peripheral device 102. For example, the transfer controller 204 may detect a deadlock in a data transfer and rollback and/or restart the data transfer, terminate the data transfer, reallocate resources of the data transfer, providing non-blocking synchronization for the data transfer, preempting resources of the data transfer, or the like. In a further embodiment, the transfer controller 204 may ensure or protect data integrity of data being transferred using the virtual channel 150. For example, the transfer controller 204 may provide ECC, parity, or other data protection for data in the memory buffer 202. The transfer controller 204 may support one or more retry semantics, data flow poisoning semantics, error reporting semantics, or the like, allowing a data source peripheral device 102 and/or a data target peripheral device 102 to retry a failed or faulty data transfer, to poison a data transfer to signal an error or failure, or the like.

Figure 3:
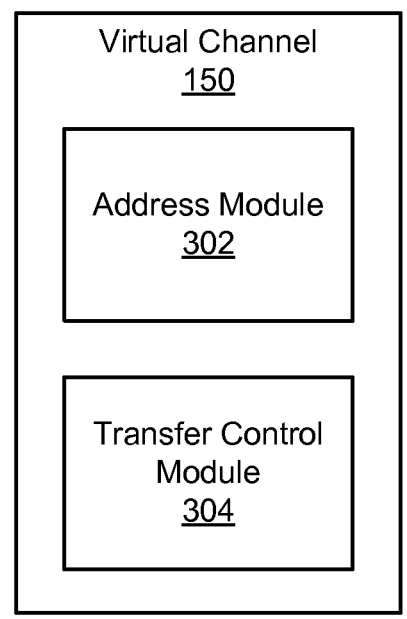
FIG. 3 is a schematic block diagram illustrating another embodiment of a virtual channel.

FIG. 3 depicts another embodiment of a virtual channel 150. The virtual channel 150 may be substantially similar to the virtual channel 150 described above with regard to FIGS. 1A, 1B, and 2. In the depicted embodiment, the virtual channel 150 includes an address module 302 and a transfer control module 304. The address module 302 and/or the transfer control module 304, in certain embodiments, may be part of or may execute on a transfer controller 204 as described above.

In one embodiment, the address module 302 presents a logical address space for the memory buffer 202, over the peripheral bus 125 or the like, allowing peripheral devices 102, device drivers, a transfer portal 118, or other entities to transfer data using the memory buffer 202 of the virtual channel 150. The address module 302 may be part of or operate in cooperation with the transfer controller 204, described above, and may present the logical address space for the memory buffer 202 for the transfer controller 204.

The address module 302 may make a logical address for the memory buffer 202 available using MMIO, port I/O, PMIO, memory mapped file I/O, or the like as described above with regard to the transfer controller 204. The address module 302, in certain embodiments, makes the presented logical address space available to peripheral devices 102 and/or applications using a PCI-e BAR mechanism or the like. In other embodiments, the address module 302 may make the presented logical address space directly accessible via a memory bus of a processor 111, using an interface such as a DDR memory interface, HyperTransport, QPI, or the like. In various embodiments, the address module 302 may make the logical address space of the memory buffer 202 accessible using memory access semantics, such as CPU load/store, DMA, $3^{rd}$ party DMA, RDMA, atomic test and set, or the like.

The address module 302 may support DMA operations for the memory buffer 202 using the presented logical address space, allowing DMA engines 117 of peripheral devices 102 to perform DMA writes and/or DMA reads to complete data transfers using the virtual channel 150. In certain embodiments, the address module 302 may allow both a DMA engine 117 of the data source peripheral device 102 and a DMA engine 117 of the data target peripheral device 102 to transfer data of the same data transfer as DMA masters, without waiting for acknowledgments from the DMA engine 117 of the other peripheral device 102, providing dual-master transfers, masterless transfers, or the like.

The address module 302, in one embodiment, presents a logical address space for the memory buffer 202 that is larger than a physical capacity of the memory buffer 202, so that the memory buffer 202 and/or the virtual channel 150 appears to the peripheral devices 102A-N, to applications, or the like as having the larger capacity of the presented logical address space. The address module 302 may hide or mask the physical capacity of the memory buffer 202, such that the peripheral devices 102A-N, applications, and/or device drivers access the memory buffer 202 exclusively using the presented logical address space.

As described above, a logical address space may comprise a logical or virtual representation of the memory buffer 202, with a plurality (e.g., range) of logical addresses, at least a portion of which the address module 302 maps to physical locations in the memory buffer 202. The address module 302, in one embodiment, maps or associates certain logical addresses from the presented logical address space with locations in the memory buffer 202 of the virtual channel 150. In one embodiment, the address module 302 may map a range of logical addresses, such as the sliding window described below, to the physical capacity of the memory buffer 202, tracking a logical and/or physical location to which a data source peripheral 102 is writing data, a logical and/or physical location from which a data target peripheral 102 is reading data, or the like. For example, the address module 302 may determine and maintain an offset for the memory buffer 202 within the presented logical address space, moving the offset through the logical address space with a sliding window, rolling or reusing the memory buffer as a ring-buffer, or the like.

In another embodiment, the address module 302 may map logical addresses from the presented logical address space separately and/or independently to physical locations in the memory buffer 202, so that contiguous logical addresses may not necessarily map to contiguous physical locations in the memory buffer 202, but the address module 302 may dynamically reuse locations in the memory buffer 202 as they become available. In such an embodiment, the address module 302 may maintain a logical-to-physical address mapping structure, with entries mapping logical addresses or logical address ranges to physical locations in the memory buffer 202 that store the data of the logical addresses.

In one embodiment, the transfer control module 304 may manage or control a rate at which a data source peripheral device 102 and/or a data target peripheral device 102 transfers data using the memory buffer 202 of the virtual channel 150, providing flow control for data transfers or the like. The transfer control module 304 may be part of or operate in cooperation with the transfer controller 204, described above, and may manage or control data transfer rates for the transfer controller 204, so that the address module 302 may present a larger logical address space for the memory buffer 202 than its physical capacity, without allowing the memory buffer 202 to be overrun.

In one embodiment, the transfer control module 304 may control a rate at which a data source peripheral device 102 transfers data to the memory buffer 202 using the logical address space that the address module 302 presents, based on a rate at which a data target peripheral device 102 transfers or receives data from the memory buffer 202 or the like, so that an amount of data stored in the memory buffer 202 remains at or below the physical capacity of the memory buffer 202, and a data source does not overwrite data that has not yet been transferred to a data target. In a further embodiment, the transfer control module 304 may control a rate at which a data target peripheral device 102 transfers or receives data from the memory buffer 202, both a rate at which a data source peripheral device 102 transfers data to the memory buffer 202 and a rate at which a data target peripheral device 102 transfers or receives data from the memory buffer 202, or the like.

The transfer control module 304 may throttle or otherwise control a rate at which a data source peripheral device 102 writes data to the memory buffer 202 based on a rate at which a data target peripheral device 102 reads data from the memory buffer 202, to ensure that data written or transferred to the memory buffer 202 by a data source peripheral device 102 does not overrun or exceed the capacity of the memory buffer 202 or the like. In one embodiment, the transfer control module 304 may stop or throttle a data source peripheral device 102 from writing or otherwise transferring data to the memory buffer 202 in response to a data source peripheral device 102 filling the memory buffer 202 with data of a data transfer. In a further embodiment, the transfer control module 304 may stop or throttle a data source peripheral device 102 from writing or otherwise transferring data to the memory buffer 202 in response to the data source peripheral device 102 exceeding an allocated amount of the memory buffer 202. In another embodiment, the transfer control module 304 may stop or throttle a data source peripheral device 102 from writing or otherwise transferring data to the memory buffer 202 in response to the data source peripheral device 102 exceeding a transfer threshold, a transfer rate, or the like. The transfer control module 304 may allow a data source peripheral device 102 to continue to transfer or write additional data of a data transfer to the memory buffer 202 in response to a data target peripheral device 102 reading data of the data transfer from the memory buffer 202 and deleting or removing the read data from the memory buffer 202, or the like.

The transfer control module 304, in one embodiment, manages or controls a rate at which a data source peripheral device 102 and/or a data target peripheral device 102 transfers data (e.g., provides flow control) by managing, allocating, or otherwise providing transfer credits, such as write credits and/or read credits, to the peripheral devices 102. A credit, as used herein, comprises an indication of permission to transfer data to or from a memory buffer 202 of a virtual channel 150. A credit may comprise a message, a signal, an identifier, a count, an acknowledgment, a flag, a status register, or another indication of permission to transfer data. The transfer control module 304 may limit an amount of write credits provided or allocated to a data source peripheral device 102 for a data transfer, so that the amount of write credits is less than or equal to an amount of available storage capacity for the data transfer in the memory buffer 202.

In response to a data target peripheral device 102 reading data of the data transfer from the memory buffer 202, the transfer control module 304 may erase, remove, delete, trim, overwrite, or otherwise clear the data from the memory buffer 202. In a further embodiment, the transfer control module 304 may allow a data source peripheral device 102 to overwrite data of a data transfer that has already been read by or transferred to a data target peripheral device 102. The transfer control module 304 may allocate or provide one or more additional write credits to a data source peripheral device 102, corresponding to the storage capacity reclaimed in the memory buffer 202 from the read data. In a further embodiment, the transfer control module 304 may allocate or provide one or more read credits to a data target peripheral device 102 to read or transfer data of a data transfer from the memory buffer 202 in response to a data source peripheral device 102 writing the data of the data transfer to the memory buffer 202. By managing a rate at which write credits are allocated to a data source peripheral device 102 and a rate at which read credits are allocated to a data target peripheral device 102, the transfer control module 304, in certain embodiments, may control how much data of a data transfer is stored in a memory buffer 202 at a specific point in time, so that a presented logical address space for the memory buffer 202 may exceed the physical capacity of the memory buffer 202.

In a further embodiment, the transfer control module 304 may manage or control a rate at which a data source peripheral device 102 transfers data of a data transfer to the memory buffer 202 and/or a rate at which a data target peripheral device 102 transfers data of a data transfer from the memory buffer 202 (e.g., provide flow control) by managing a rate at which acknowledgments are sent from the virtual channel 150 to the peripheral devices 102, a rate at which storage requests are fulfilled by the memory buffer 202, or the like. A data source peripheral device 102, in certain embodiments, waits for an acknowledgment that data is stored in the memory buffer 202 before transferring the next segment of data to the memory buffer 202. Similarly, a data target peripheral device 102, in certain embodiments, waits until data of a read request is received from the memory buffer 202 (e.g., the read request is satisfied) before sending a read request for the next segment of data of the data transfer.

In one embodiment, the transfer control module 304 may send an acknowledgment to a data source peripheral device 102, acknowledging storage of data of a data transfer in the memory buffer 202, only if free capacity or room exists in the memory buffer 202 for the data source peripheral device 102 to write additional data (e.g., a next data segment) of the data transfer. For example, if the memory buffer 202 is full, the transfer control module 304 may wait until a data target peripheral device 102 transfers data from the memory buffer 202 before the transfer control module 304 sends an acknowledgment to the data source peripheral device 102, allowing the data source peripheral device 102 to write more data to the memory buffer 202. In a further embodiment, the transfer control module 304 may wait to fulfill a read request from a data target peripheral device 102 for data of a data transfer until a data source peripheral device 102 has written the data to the memory buffer 202. By managing or controlling a rate at which acknowledgments are sent, read requests are satisfied, or the like, in one embodiment, the transfer control module 304 may control a rate that one or more peripheral devices 102 transfer data to or from the memory buffer 202 using a presented logical address space, so that the size of the presented logical address space may be larger than the physical capacity of the memory buffer 202.

The transfer control module 304, in one embodiment, controls transfer rates for a data source peripheral device 102 and/or a data target peripheral device 102 or otherwise provides flow control using a sliding window within the presented logical address space. In certain embodiments, logical addresses within the sliding window store data (e.g., are mapped to physical addresses of the memory buffer 202 that store data) and the transfer control module 304 removes, deletes, clears, or expires data that falls out of the sliding window (e.g., data that a data target peripheral device 102 has transferred out of the memory buffer 202). The transfer control module 304 may manage the sliding window and/or the transfer rates for the memory buffer 202 so that the sliding window fits within (e.g., is less than or equal to) a size of the memory buffer 202. The transfer control module 304 may manage the memory buffer 202 as a ring buffer, cycling or rolling through the memory buffer 202 in a logically circular manner, reusing physical storage locations of the memory buffer 202 as the sliding window moves through the presented logical address space.

Figure 4:
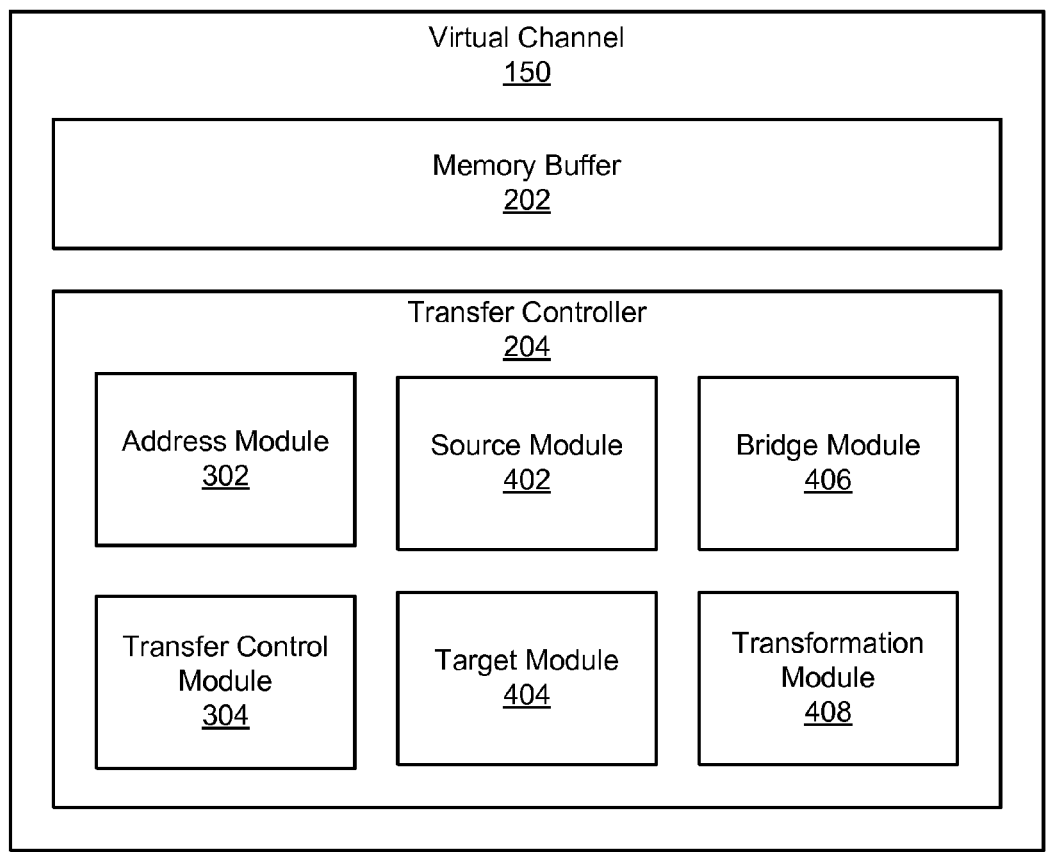
FIG. 4 is a schematic block diagram illustrating a further embodiment of a virtual channel.

FIG. 4 depicts a further embodiment of a virtual channel 150. The virtual channel 150 may be substantially similar to the virtual channel 150 described above with regard to FIGS. 1A, 1B, 2, and 3. In the depicted embodiment, the virtual channel 150 includes a memory buffer 202 and a transfer controller 204, substantially as described above with regard to FIG. 2. The transfer controller 204, in the depicted embodiment, includes an address module 302, a transfer control module 304, a source module 402, a target module 404, a bridge module 406, and a transformation module 408.

In one embodiment, the source module 402 is configured to receive data of a data transfer from a source such as a data source peripheral device 102, over a peripheral bus 125 or the like, for storage in the memory buffer 202 and transfer to a target, such as a data target peripheral device 102. The source module 402 may be configured to cooperate with the address module 302 to receive data at one or more logical addresses and to store the data at one or more physical addresses or physical locations of the memory buffer 202, in response to a write request, a memory semantic store command, or the like for a data transfer. The source module 402 may be configured to support DMA, RDMA, third party DMA, or other writes to the memory buffer 202 using the presented logical address space. For example, the source module 402 may interface directly with a DMA engine 117 of a data source peripheral device 102 to receive data in the memory buffer 202.

In one embodiment, the target module 404 is configured to provide data of a data transfer from the memory buffer 202 to a target such as a data target peripheral device 102, over a peripheral bus 125 or the like. The target module 404 may be configured to cooperate with the address module 302 to transfer data associated with one or more logical addresses from one or more physical addresses or physical locations of the memory buffer 202 to a target in response to a read request, a memory semantic load command, or the like for a data transfer. The target module 404 may be configured to support DMA, RDMA, third party DMA, or other reads from the memory buffer 202 using the presented logical address space. For example, the target module 402 may interface directly with a DMA engine 117 of a data target peripheral device to transfer data from the memory buffer 202 to the data target peripheral device 102.

The target module 404, in certain embodiments, is configured to remove transferred data from the memory buffer 202 in response to transferring the data from the memory buffer 202 to a target such as a data target peripheral device 102. The target module 404 may remove transferred data in cooperation with the transfer control module 304 or the like. Removing transferred data from the memory buffer 202 dynamically during the data transfer, may provide storage capacity for additional data of the data transfer, so that a smaller memory buffer 202 may be used than a logical address space for the memory buffer 202.

As described above, in certain embodiments, the memory buffer 202 may be byte addressable, and may be configured to service storage requests or memory requests for variable sized ranges of data. The source module 402, in one embodiment, may receive data at a different data transfer size than the target module 404 transfers data from the memory buffer 202, allowing operability with different types of data source peripheral devices 102 and data target peripheral devices 102. The source module 402 and/or the target module 404 may communicate with peripheral devices 102 over the peripheral bus 125 such as a PCIe bus, through the I/O hub 104, or the like. In certain embodiments, the source module 402 and/or the target module 404 may transfer data to and from the memory buffer 202 using the peripheral bus 125 so that data of the data transfer is not stored in the host memory 112 as part of the data transfer.

In one embodiment, the source module 402 may be configured to combine or otherwise process data from multiple data sources (e.g., multiple data source peripheral devices 102) in a multi-producer arrangement and to store the combined or processed data in the memory buffer 202, so that a data target (e.g., a data target peripheral device 102) may transfer the combined or processed data from the memory buffer 202. The source module 402, for example, may perform an exclusive OR (XOR) operation or another combining operation on data from multiple data sources, in cooperation with the transformation module 408 described below, or the like. A combining operation, such as an XOR operation, may be useful to provide or determine parity information or other ECC information for data. In one embodiment, the source module 402 may determine whether each data source has provided data for a data transfer.

Once each data source has provided data, in separate memory buffers 202, separate locations in a memory buffer 202, or the like, the transformation module 408 may apply a function to the data to produce a result which the target module 404 may transfer to a target such as a data target peripheral device 102. In another embodiment, multiple data sources may provide data one at a time (e.g., in a round-robin configuration or the like) and the transformation module 408 may determine an accumulated value for storage in a single memory buffer 202. In certain embodiments, where a data function the transformation module 408 applies has a certain commutativity and/or associativity property, an order of arrival of data from different data sources may not matter and may be unrestricted, or the like. In embodiments with multiple producers or data sources, a data error, incorrect data, missing data, "poison" data, or the like may affect or be carried through to each of one or more data targets for the data. To prevent double accumulation or the like, the source module 402 may disallow, prevent, or fail to support retry operations in embodiments with multiple data sources.

The target module 404, in one embodiment, is configured to transfer data of a data transfer from the memory buffer 202 to multiple data targets such as data target peripheral devices 102, in a multi-consumer arrangement. In certain embodiments, the transformation module 408 may apply different data transform functions to data for different data targets, and the target module 404 may provide the different data to the different data targets. In another embodiment, the target module 404 may simulcast the same data of a data transfer to multiple data targets without the transformation module 408 transforming the data.

The virtual channel 150 and/or the transfer controller 204, in certain embodiments, may comprise multiple source modules 402 and/or multiple target modules 404, each compatible with a different type or class of peripheral device 102. For example, the virtual channel 150 and/or the transfer controller 204 may include different source modules 402 and/or different target modules 404 for different device types, models, vendors or the like such as for non-volatile memory devices 120, NICs 113, GPUs 124, local devices, remote devices, different types of peripheral buses 125, or the like. Different source modules 402 and/or target modules 404 may support different descriptors or parameters for data transfers, based on the supported data source and/or data target.

In one embodiment, the bridge module 406 provides support for data sources and/or data targets that lack support for the virtual channel 150 directly, such as legacy data sources and/or data targets. For example, certain peripheral devices 102 may not support or be compatible with the transfer control module 304 controlling rates of data transfers directly, with write credits, with read credits, or the like and one or more bridge modules 406 may bridge data transfers for the incompatible peripheral devices 102. The bridge module 406, in certain embodiments, may filter or intercept requests, acknowledgments, or other communications between the virtual channel 150 and one or more data sources and/or data targets. The bridge module 406 may translate or reconfigure one or more communications for compatibility with a peripheral device 102. In a further embodiment, the bridge module 406 may buffer data of a data transfer between the virtual channel 150 and a peripheral device 102, allowing the transfer control module 304 to control transfer rates for incompatible or legacy peripheral devices 102.

In one embodiment, the transformation module 408 transforms data transferred to the memory buffer 202 prior to a data target peripheral device 102 transferring the transformed data from the memory buffer 202, applying a data transformation, predicate, condition, function, or the like to the data. As used herein, transforming data comprises adjusting or changing at least one data value according to a defined pattern or method. For example, as described above, the transformation module 408 may combine data from multiple sources, perform an XOR on data from multiple sources, or the like.

In one embodiment, the transformation module 408 may combine data from multiple sources to generate a first parity, using XOR as described above. In a further embodiment, the transformation module 408 may generate a second consumable output, such as a second parity, using a Reed Solomon or other double parity algorithm. The transformation module 408, in various embodiments, may perform another type of N+M loss correction coding, such that with N inputs, the transformation module 408 determines M additional values so that with any N of the N+M values, the original M values can be redetermined.

The transformation module 408, in another embodiment, may transform data by adding and/or removing T10 Data Integrity Field (DIF)/DIX metadata to data of a data transfer for managing data integrity. Adding of data for the purpose of data integrity protection may be advantageous where the non-volatile memory device 120 serves in a tiered storage architecture in which the non-volatile memory device 120 passes data down to lower tiers. Where the lower tiers do not offer a desired level of data integrity protection such as the DIF/DIX metadata, the transformation module 408 may supply such missing functionality. For example, where the non-volatile memory device 120 is used as a cache in front of a backing store that does not support the T10 DIF form of data integrity protection.

T10 DIF metadata comes in different types. The T10 DIF metadata may be passed through an I/O stack to facilitate identifying if there is a data integrity error. For T10 DIF, the integrity metadata is 8 bytes—the 8 bytes are a tuple of (a 16 bit CRC, a 16 bit placation tag, and a 32 bit reference tag—often an incrementing counter). By applying a T10 DIF transformation, the transformation module 408 may accomplish a goal of T10 DIF by computing this metadata as close in proximity to the original data as possible. The DIF/DIX data integrity computation adds an additional layer of data integrity protection (regardless of the underlying media). T10 DIF/DIX implements a Cyclic Redundancy Check (CRC) so, while errors are not correctable by T10 DIF metadata they are detectable.

In another embodiment, the transformation module 408 applies a data transformation comprising a filter that reduces the size of the set of data received for a data transfer based on some predicate or condition that excludes data that fails to satisfy the predicate. Filtering of data between a data source peripheral device 102 and a data target peripheral device 102 may permit efficient use of the communication path (e.g. the peripheral bus 125). In a further embodiment, the transformation module 408 may apply a data transformation that compresses data, such as run length encoding, Lempel-Ziv (LZ) compression, Lempel-Ziv-Welch (LZW) compression, Lempel-Ziv-Renau (LZR) compression, Huffman encoding, or the like. In one embodiment, the transformation module 408 may encrypt data of a data transfer, or the like.

Figure 5A:
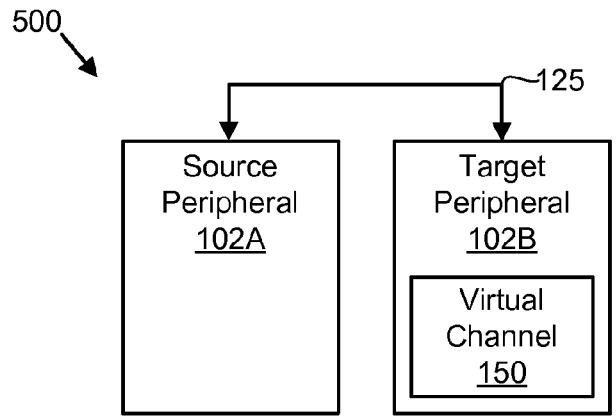
FIG. 5A is a schematic block diagram illustrating one embodiment of a system for a virtual channel.

FIG. 5A depicts one embodiment of a system 500 for a virtual channel 150. In the system 500, the virtual channel 150 is located on or integrated with a data target peripheral device 102B. A data source peripheral device 102A may transfer data of a data transfer to the virtual channel 150 of the data target peripheral device 102B over the peripheral bus 125, and the data target peripheral device 102B may transfer data of the data transfer from the virtual channel 150 internally using a local bus or the like.

In certain embodiments, locating a virtual channel 150 on a data target peripheral device 102B may provide more efficient data transfers than locating the virtual channel 150 on a data source peripheral device 102A, a third-party data transfer peripheral device 102, or the like. For example, it may require fewer steps, less time, or otherwise be more efficient for a virtual channel 150 to complete a data transfer internally within a data target peripheral device 102B than to coordinate with or push data to a separate data target peripheral device 102B, or the like. In embodiments with the virtual channel 150 on a data target peripheral device 102B, DMA writes from the data source peripheral device 102A to the data target peripheral device 102B may be more efficient because the transfer may take one step rather than two separate steps.

However, in certain embodiments, the data target peripheral device 102B in one data transfer, may be the data source peripheral device 102A in another data transfer. In one embodiment, the virtual channel 150 may be located on or integrated with a peripheral device 102 that comprises a data target peripheral device 102B for the greatest portion or percentage of data transfers, or the like.

Figure 5B:
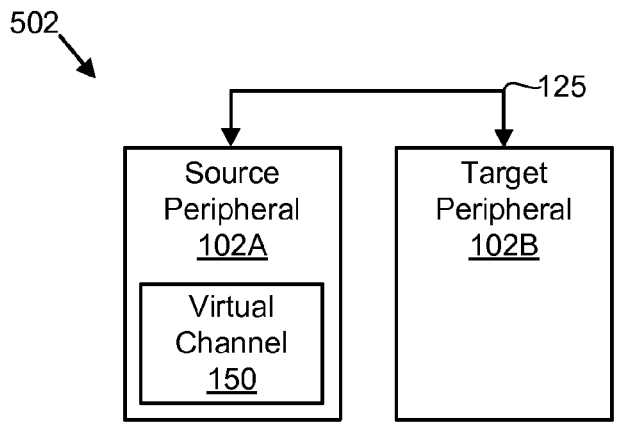
FIG. 5B is a schematic block diagram illustrating a further embodiment of a system for a virtual channel.

FIG. 5B depicts a further embodiment of a system 502 for a virtual channel 150. In the system 502, the virtual channel 150 is located on or integrated with a data source peripheral device 102A. A data source peripheral device 102A may transfer data of a data transfer to the virtual channel 150 internally using a local bus or the like, and the data target peripheral device 102B may transfer data of the data transfer from the virtual channel 150 of the data source peripheral device 102A over the peripheral bus 125.

Figure 5C:
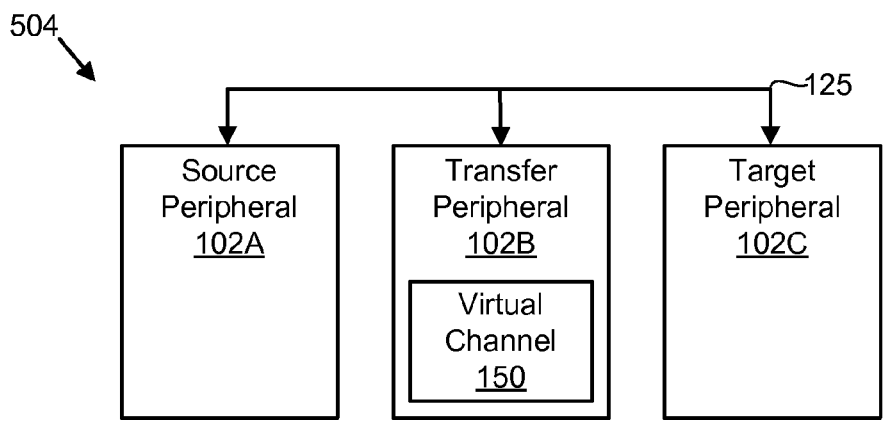
FIG. 5C is a schematic block diagram illustrating another embodiment of a system for a virtual channel.

FIG. 5C depicts another embodiment of a system 504 for a virtual channel 150. In the system 504, the virtual channel 150 is located on or integrated with a dedicated transfer peripheral device 102B, that is configured to facilitate data transfers between a data source peripheral device 102A and a data target peripheral device 102C. The data source peripheral device 102A may transfer data of a data transfer to the virtual channel 150 of the transfer peripheral device 102B over the peripheral bus 125, and the data target peripheral device 102C may transfer data of the data transfer from the virtual channel 150 of the transfer peripheral device 102B over the peripheral bus 125.

Figure 6A:
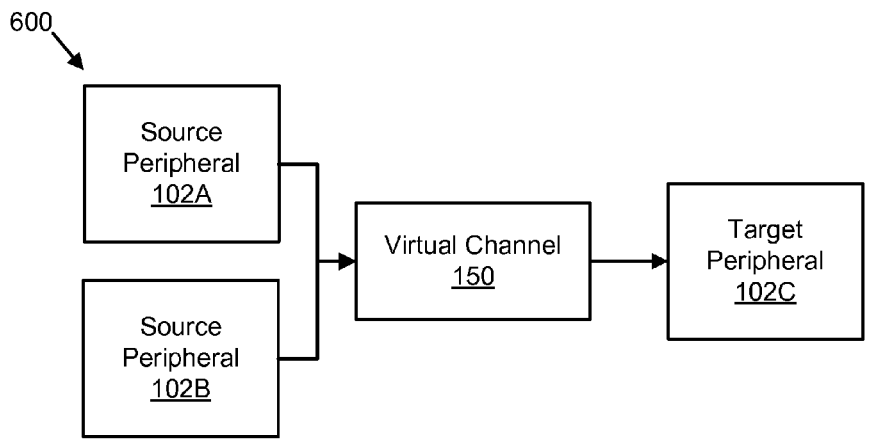
FIG. 6A is a schematic block diagram illustrating one embodiment of a system for a virtual channel.

FIG. 6A depicts one embodiment of a system 600 for a virtual channel 150. In the system 600, the virtual channel 150, using the source module 402 or the like, combines data from a plurality of data source peripheral devices 102A, 102B and transfers the combined data to a single data target peripheral device 102C, using the target module 404 or the like. In other embodiments, the virtual channel 150 and/or the target module 404 may transfer combined data from a plurality of data source peripheral devices 102A, 102B to a plurality of data target peripheral devices 102C.

Figure 6B:
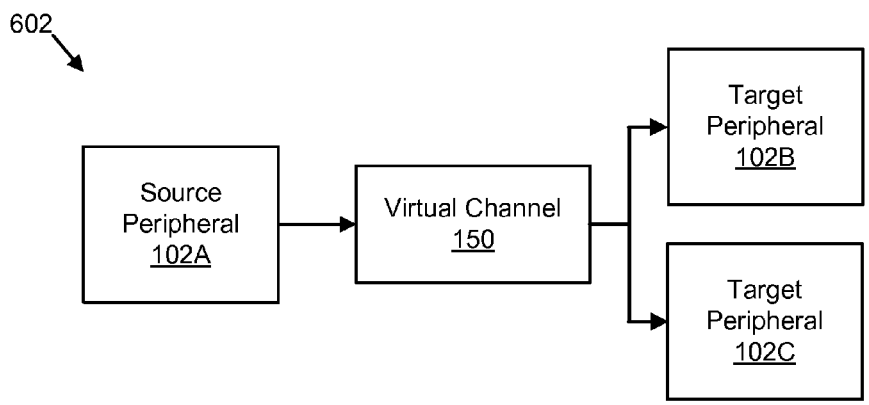
FIG. 6B is a schematic block diagram illustrating a further embodiment of a system for a virtual channel.

FIG. 6B depicts a further embodiment of a system 602 for a virtual channel 150. In the system 602, the virtual channel 150, using the source module 402 or the like, receives data of a data transfer from a single data source peripheral device 102A and transfers the data to a plurality of data target peripheral devices 102B, 102C, using the target module 404 or the like. In other embodiments, the virtual channel 150 and/or the target module 404 may transfer combined data from a plurality of data source peripheral devices 102A to the plurality of data target peripheral devices 102B, 102C.

Figure 6C:
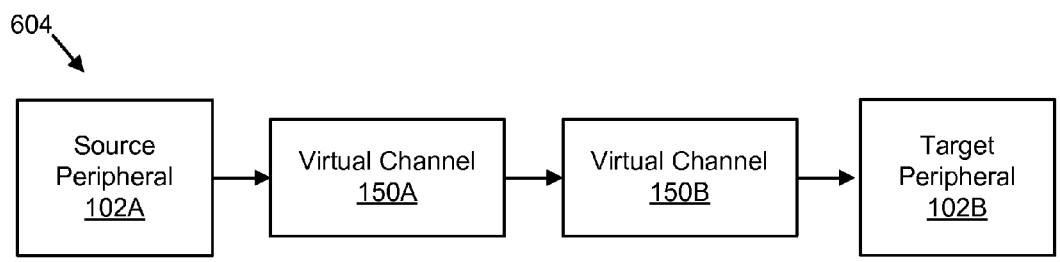
FIG. 6C is a schematic block diagram illustrating another embodiment of a system for a virtual channel.

FIG. 6C depicts another embodiment of a system 604 for a virtual channel 150. The system 604 includes a plurality of virtual channels 150A, 150B in a pipeline configuration to transfer data from a data source peripheral device 102A, through the plurality of virtual channels 150A, 150B, and to a data target peripheral device 102B. The different virtual channels 150A, 150B may be configured to perform different types of data transformations on the data of the data transfer, as described above with regard to the transformation module 408. For example, a first virtual channel 150A may compress data of a data transfer and a second virtual channel 150B may determine parity or other ECC data for the compressed data, or vice versa.

Figure 7:
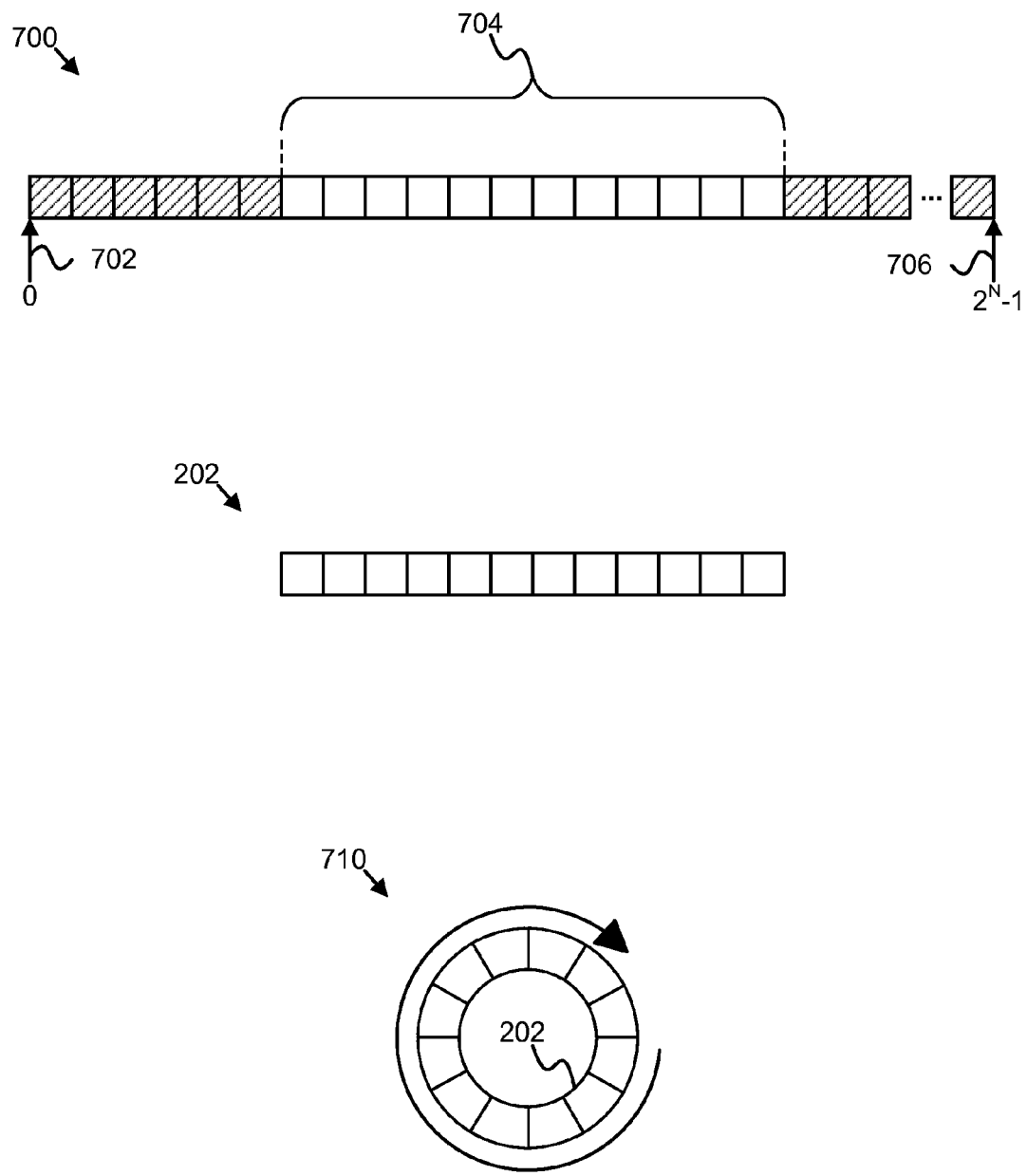
FIG. 7 is a schematic block diagram illustrating one embodiment of an address space for a memory buffer.

FIG. 7 depicts one embodiment of a presented logical address space 700 for a memory buffer 202 which may logically be used as a ring buffer 710. The logical address space 700 ranges between a starting logical address 702 of zero, to an ending logical address 706 of $2^N-1$. As described above, the address module 302 and the transfer control module 304 may manage data transfers using a sliding window 704 that is less than or equal to an actual physical capacity of the memory buffer 202. The address module 302 may map logical addresses from the logical address space 700 to physical locations of the memory buffer 202. In the depicted embodiment, the address module 302 maps the logical addresses associated with the sliding window 704 to the physical locations of the memory buffer 202. The transfer control module 304, as described above, may control a rate at which a data source peripheral device 102 writes data to the memory buffer 202 using the logical address space 700, so that the data transfer remains within the sliding window 704 and does not exceed or overrun the memory buffer 202, overwriting data that has not yet been transferred.

The transfer control module 304 may move the sliding window 704 through the logical address space 700, starting at the first logical address 702 toward the last logical address 706, and wrapping around back to the first logical address 702 once the last logical address 706 is reached. In this manner, the logical address space 700 may be re-used for data transfers in a cyclic manner, and may be managed as a ring buffer.

The address module 302 and/or the transfer control module 304 may manage the memory buffer 202 logically as a ring buffer 710. As a data target peripheral device 102 reads data from a tail or end of the sliding window 704 (e.g., a lowest logical address of the sliding window 704), the transfer control module 304 may slide or increment the sliding window, allowing a data source peripheral device 102 to write data of the data transfer to the next logical address at a head or start of the sliding window 704 (e.g., a highest logical address of the sliding window 704). Although the data source peripheral device 102 may write the data to an incrementally higher logical address, the address module 302 may re-use the physical capacity of the memory buffer 202 freed by the data target peripheral device 102 reading or transferring data of the data transfer from the memory buffer 202. In certain embodiments, the memory buffer 202 may logically wrap around on itself as a ring buffer 710 in a circular manner, rolling through the logical address space 700 with the sliding window 704 as data segments of the memory buffer 202 are reused, thereby appearing to peripheral devices 102 as having the capacity of the larger logical address space 700.

Figure 8:
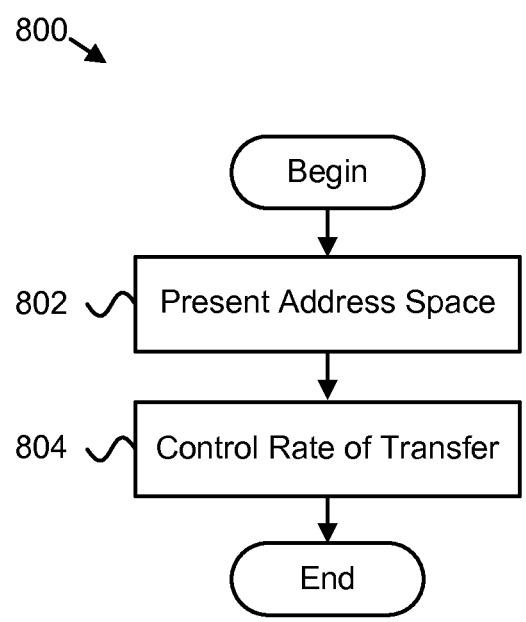
FIG. 8 is a schematic flow chart diagram illustrating one embodiment of a method for a virtual channel.

FIG. 8 depicts one embodiment of a method 800 for a virtual channel 150. The method 800 begins and the address module 302 presents 802 an address space 700 for a memory buffer 202. In one embodiment, the presented 802 address space 700 is larger than a physical capacity of the memory buffer 202. The transfer control module 304 controls 804 a rate at which a data source 120 transfers data to the memory buffer 202 using the presented 802 address space 700 based on a rate at which a data target 102 transfers data from the memory buffer 202 using the presented 802 address space 700 so that an amount of data stored in the memory buffer 202 remains at or below the physical capacity of the memory buffer 202 and the method 800 ends.

Figure 9:
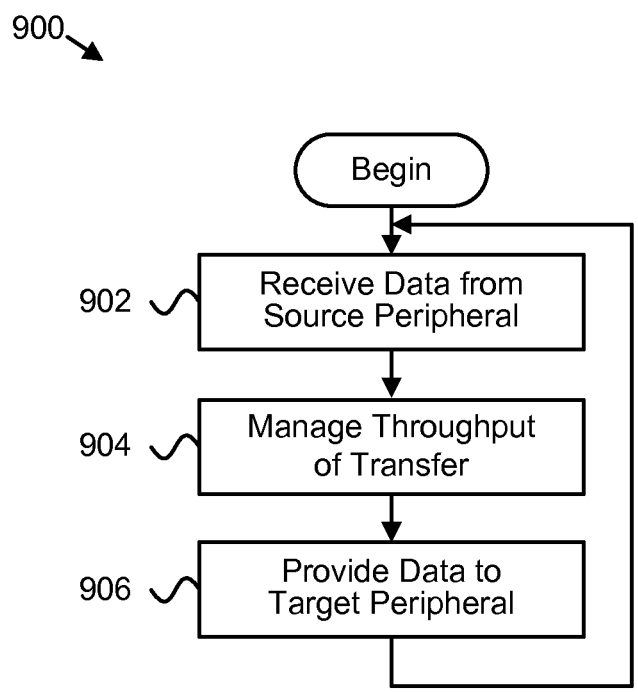
FIG. 9 is a schematic flow chart diagram illustrating another embodiment of a method for a virtual channel.

FIG. 9 depicts another embodiment of a method 900 for a virtual channel 150. The method 900 begins and the source module 402 receives 902 data of a data transfer from a source peripheral 102 using a peripheral bus 125. The transfer control module 304 manages 904 throughput of the data transfer using a transfer buffer 202 on the peripheral bus 125 so that the source peripheral 102 and the target peripheral 102 transfer the data of the data transfer without acknowledgments between the source peripheral 102 and the target peripheral 102. The target module 404 provides 906 the data of the data transfer to a target peripheral 102 using the peripheral bus 125 and the source module 402 continues to receive 902 data of the data transfer as the method 900 continues.

Figure 10:
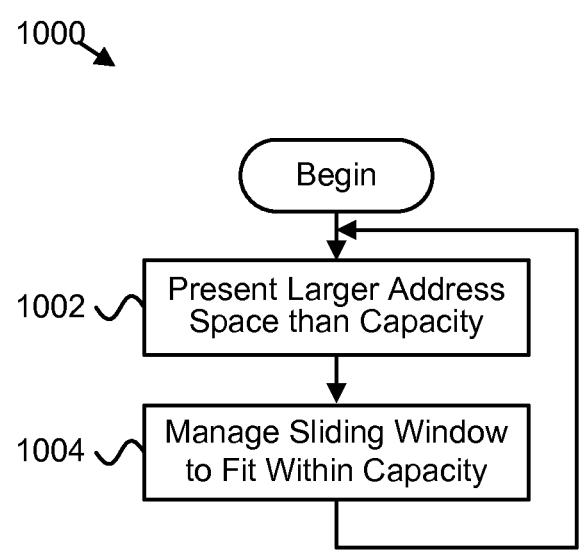
FIG. 10 is a schematic flow chart diagram illustrating a further embodiment of a method for a virtual channel.

FIG. 10 depicts a further embodiment of a method 1000 for a virtual channel 150. The method 1000 begins and the address module 302 presents 1002 a larger address space 700 for a transfer buffer 202 than a physical capacity of the transfer buffer 202. The transfer control module 304 manages 1004 a sliding window 704 between a position in the presented 1002 address space 700 to which a data source writes data and a position in the presented address space 700 from which a data target reads data such that a size of the sliding window 704 fits within the physical capacity of the transfer buffer.

Figure 11:
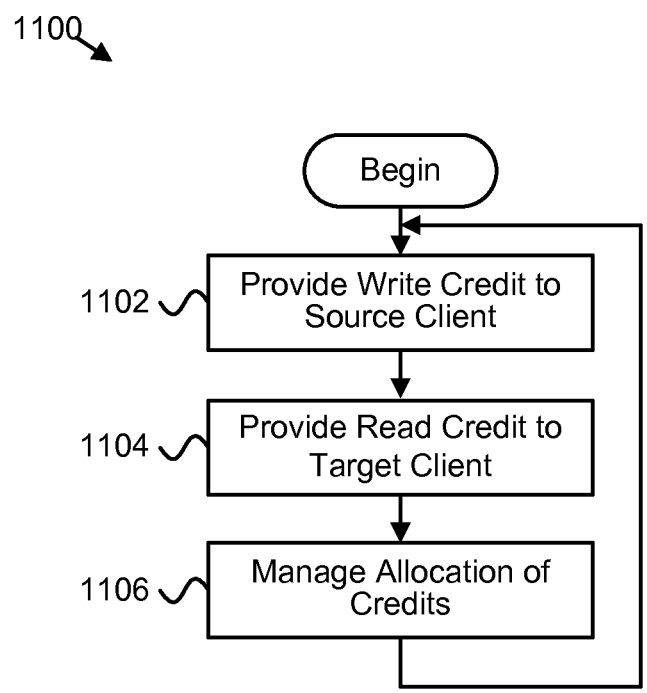
FIG. 11 is a schematic flow chart diagram illustrating an additional embodiment of a method for a virtual channel.

FIG. 11 depicts an additional embodiment of a method 1100 for a virtual channel 150. The method 1100 begins and the transfer control module 304 provides 1102 a write credit to a source client 102 to write data of a data transfer to a memory buffer 202. The transfer control module 304 provides 1104 a read credit to a target client 102 to read data of the data transfer from the memory buffer 202. The transfer control module 304 manages 1106 allocation of write credits and read credits so that a size of the memory buffer 202 is smaller than a presented address space 700 for the memory buffer 202.

Figure 12:
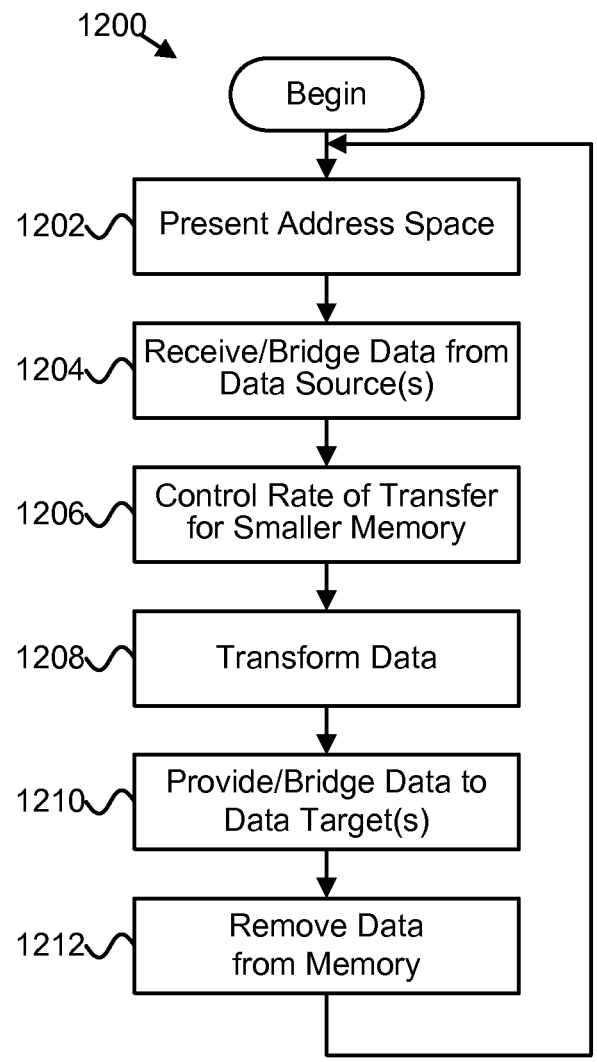
FIG. 12 is a schematic flow chart diagram illustrating a further embodiment of a method for a virtual channel.

FIG. 12 depicts a further embodiment of a method 1200 for a virtual channel 150. The method 1200 begins and the address module 302 presents 1202 a logical address space 700 for a memory buffer 202 of a virtual channel 150 that is larger than a physical capacity of the memory buffer 202. The source module 402 and/or the bridge module 406 receives 1204 data of a data transfer from a data source peripheral 102. For example, the source module 402 may receive 1204 data directly from a data source peripheral 102 if the data source peripheral 102 supports the virtual channel 150 and the bridge module 406 may bridge 1204 data from a data source peripheral 102 to the source module 402 if the data source peripheral 102 does not support the virtual channel 150. In other embodiments, the virtual channel 150 may be backwards compatible such that legacy data source peripherals 102 may transfer data using the virtual channel 150 without a bridge module 406.

The transfer control module 304 controls 1206 a rate that the data is transferred from the data source peripheral 102, either directly or using the bridge module 406, so that the logical address space 700 may be larger than a physical capacity of the memory buffer 202 of the virtual channel 150. In certain embodiments, the transformation module 408 transforms 1208 the received 1204 data. The target module 402 and/or the bridge module 406 provides 1210 the transformed 1208 data of the data transfer to a data target peripheral 102. For example, the target module 404 may provide 1210 data directly to a data target peripheral 102 if the data target peripheral 102 supports the virtual channel 150 and the bridge module 406 may bridge 1210 data from the target module 404 to a data target peripheral 102 if the data target peripheral 102 does not support the virtual channel 150. In other embodiments, the virtual channel 150 may be backwards compatible such that legacy data target peripherals 102 may transfer data using the virtual channel 150 without a bridge module 406, as described above. The target module 404 and/or the transfer control module 304 removes 1212 the provided 1210 data from the memory buffer 202 and the method 1200 continues, with the address module 302 continuing to present 1202 the logical address space 700 for the memory buffer 202 for data transfers.

A means for presenting a larger address space 700 for a transfer buffer 202 than a physical capacity of the transfer buffer 202, in various embodiments, may include a virtual channel 150, an address module 302, a transfer control module 304, a peripheral device 102, other logic hardware, and/or other executable code stored on a computer readable storage medium. Other embodiments may include similar or equivalent means for presenting a larger address space 700 for a transfer buffer 202 than a physical capacity of the transfer buffer 202.

A means for managing a sliding window 704 between a position in a presented address space 700 to which a data source 102 writes data and a position in the presented address space 700 from which a data target 102 reads data such that a size of the sliding window 704 fits within the physical capacity of the transfer buffer 202, in various embodiments, may include a virtual channel 150, an address module 302, a transfer control module 304, a peripheral device 102, other logic hardware, and/or other executable code stored on a computer readable storage medium. Other embodiments may include similar or equivalent means for managing a sliding window 704 between a position in a presented address space 700 to which a data source 102 writes data and a position in the presented address space 700 from which a data target 102 reads data such that a size of the sliding window 704 fits within the physical capacity of the transfer buffer 202.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:
1. A method comprising:
   presenting an address space for a memory buffer, wherein the address space is larger than a physical capacity of the memory buffer;
   controlling, from a transfer controller for a peripheral device coupled to a peripheral bus, a rate at which a data source transfers data to the memory buffer over the peripheral bus based on a rate at which a data target receives data from the memory buffer such that an amount of data stored in the memory buffer remains at or below the physical capacity of the memory buffer; and managing a sliding window between a position in the presented address space to which the data source transfers data and a position in the presented address space from which the data target receives data such that a size of the sliding window is less than or equal to the physical capacity of the memory buffer.

2. The method of claim 1, further comprising overwriting transferred data from the memory buffer in response to the data target transferring the data from the memory buffer.

3. The method of claim 1, further comprising controlling the rate at which the data target transfers data from the memory buffer using the presented address space.

4. The method of claim 1, further comprising bridging the transfer of data between the data source and the memory buffer in response to the data source failing to directly support controlling the rate at which the data source transfers data to the memory buffer.

5. The method of claim 1, further comprising transforming data transferred to the memory buffer prior to the data target transferring the transformed data from the memory buffer.

6. The method of claim 1, further comprising combining data from multiple data sources and storing the combined data in the memory buffer such that the data target transfers the combined data from the memory buffer.

7. The method of claim 1, further comprising transferring data from the memory buffer to multiple data targets.

8. The method of claim 1, wherein the data source transfers data to the memory buffer and the data target transfers data from the memory buffer over the peripheral bus such that the data is transferred between the data source and the data target without being stored in memory of a host device.

9. The method of claim 1, wherein the memory buffer and the transfer controller for the memory buffer are located on the peripheral device, the peripheral device comprising one of the data source and the data target, the transfer controller configured to present the address space and control the rate at which the data source transfers data to the memory buffer.

10. The method of claim 1, wherein the memory buffer and the transfer controller for the memory buffer are located on the peripheral device, the peripheral device in communication with the data source and the data target over the peripheral bus, the transfer controller configured to present the address space and control the rate at which the data source transfers data to the memory buffer.

11. The method of claim 1, wherein the data source transfers data to the memory buffer at a different data transfer size than the data target transfers data from the memory buffer.

12. The method of claim 1, wherein controlling the rate comprises managing credits allocated to the data source to transfer data to the memory buffer.

13. The method of claim 12, further comprising managing credits allocated to the data target to transfer data from the memory buffer.

14. The method of claim 1, wherein the rate at which the data source transfers data to the memory buffer is controlled by managing a rate at which acknowledgments are sent to the data source for the transferred data.

15. An apparatus comprising:
a data recording media, the data recording media configured to store data received by way of a data transfer from a source peripheral to a target peripheral;
a transfer control module coupled to a peripheral bus, the transfer control module configured to manage throughput of the data transfer over the peripheral bus such that the source peripheral and the target peripheral transfer the data without acknowledgments between the source peripheral and the target peripheral;
a first data interconnect between the transfer control module and the peripheral bus; and
a second data interconnect between the transfer control module and the data recording media.

16. The apparatus of claim 15, further comprising an address module configured to present an address space for the data recording media to the source peripheral and the target peripheral, the presented address space being larger than a physical capacity of the data recording media, the transfer control module configured to manage the throughput of the data transfer such that an amount of data stored in the data recording media remains at or below the physical capacity of the data recording media.

17. The apparatus of claim 15, wherein at least one of the source peripheral and the target peripheral comprises one of a storage device, a graphics processor unit (GPU), and a network interface card (NIC).

18. The apparatus of claim 15, wherein the peripheral bus comprises a peripheral component interconnect express (PCIe) bus, the source peripheral and the target peripheral configured to receive and provide the data of the data transfer over the PCIe bus such that the data of the data transfer is not stored in memory of a host device.

19. An apparatus comprising:
means for presenting a larger address space for a transfer buffer than a physical capacity of the transfer buffer; and
means for managing a sliding window between a position in the presented address space to which a data source writes data and a position in the presented address space from which a data target reads data such that a size of the sliding window fits within the physical capacity of the transfer buffer, wherein the means for managing the sliding window is located on a peripheral bus.

* * * * *